United States Patent
Lam et al.

(10) Patent No.: US 11,444,929 B2
(45) Date of Patent: Sep. 13, 2022

(54) SAFEMODE MANAGEMENT OF DOMAIN TRANSITIONING

(71) Applicants: Jimmy Lam, Toronto (CA); Howard Eland, Horsham, PA (US); Cedarampattu Mohan, Horsham, PA (US)

(72) Inventors: Jimmy Lam, Toronto (CA); Howard Eland, Horsham, PA (US); Cedarampattu Mohan, Horsham, PA (US)

(73) Assignee: AFILIAS LIMITED, Dublin (IE)

( * ) Notice: Subject to any disclaimer, the term of this patent is extended or adjusted under 35 U.S.C. 154(b) by 77 days.

(21) Appl. No.: 17/126,103

(22) Filed: Dec. 18, 2020

(65) Prior Publication Data

US 2022/0200976 A1 Jun. 23, 2022

(51) Int. Cl.
  *H04L 29/06* (2006.01)
  *H04L 9/40* (2022.01)
  *H04L 9/14* (2006.01)
  *H04L 61/4511* (2022.01)

(52) U.S. Cl.
  CPC .............. *H04L 63/062* (2013.01); *H04L 9/14* (2013.01); *H04L 61/4511* (2022.05); *H04L 63/164* (2013.01)

(58) Field of Classification Search
  CPC ..... H04L 63/062; H04L 9/14; H04L 61/1511; H04L 63/164
  USPC .......................... 713/150, 151, 168; 726/1, 2
  See application file for complete search history.

(56) References Cited

U.S. PATENT DOCUMENTS

| | | | | |
|---|---|---|---|---|
| 11,218,326 | B1* | 1/2022 | Eland | G06F 16/958 |
| 2004/0199620 | A1* | 10/2004 | Ruiz | H04L 29/12009 |
| | | | | 709/223 |
| 2012/0254386 | A1* | 10/2012 | Smith | H04L 61/302 |
| | | | | 709/223 |

(Continued)

*Primary Examiner* — Izunna Okeke
(74) *Attorney, Agent, or Firm* — Haynes and Boone, LLP

(57) ABSTRACT

Methods for transitioning an existing TLD from an existing registry operator to a new TLD of a new registry operator, the new TLD subsequently accessible over a communications network, the existing TLD having a non-operational zone or an operational zone. The method includes: collecting existing registry data for the existing TLD from a plurality of registrars associated with one or more domain names of the existing TLD, such that each of the plurality of registrars provides a respective portion of the existing registry data; aggregating the respective portions of the existing registry data to generate new registry data for the new TLD; generating new zone data for the new TLD; publishing in a first mode the new zone data to nodes of a DNS (Domain Name System), the first mode disabling write functionality of the new zone data while facilitating querying of the new zone data; and publishing in a second mode the new zone data to the nodes of the DNS, the second mode facilitating the write functionality of the new zone data, including the querying and updating of the new zone data, the new zone data of the second mode considered as an operational zone; wherein the new zone data and the new registry data in the first mode as well as in the second mode are accessible by the plurality of registrars over the communications network.

40 Claims, 5 Drawing Sheets

(56) References Cited

U.S. PATENT DOCUMENTS

2014/0143381 A1* 5/2014 Gould .................. H04L 61/302
709/217

* cited by examiner

SAFEMODE MANAGEMENT OF DOMAIN TRANSITIONING

FIELD

The present invention is related to management of domain names.

BACKGROUND

Domain names are used in various networking contexts and application-specific naming and addressing purposes. In general, a domain name represents an Internet Protocol (IP) resource, such as a personal computer used to access the Internet, a server computer hosting a web site, or the web site itself or any other service communicated via the Internet. In 2014, the number of active domains reached 271 million. Today's Internet presence by companies is considered a critical element of their business.

There are a number of good reasons for having a domain name. If you ever change your web host, your domain name goes with you. Your regular visitors or customers who knew your site name would not have to be informed about a change of web address (also known as "URL"). They would simply type your domain name and they'd be brought to your new site. If you are a business, a domain name gives you credibility. Few people will be willing to do business with a company that does not have its own domain name. If you get a domain name that describes your company's business or name, people can remember the name easily and can return to your site without having to consult their documents.

Registering with a domain name registrar allows a registrant to make sure that they are registered as the owner, the administrative and technical contacts. Being the owner is vital if someone else places himself as the owner (such as your web host), he can always decide to charge you some exorbitant fee for the use of the name later. As such obtaining and retaining proper rights to a registrant's domain name portfolio is key in today's competitive landscape.

It is a disadvantage with the current domain name transitioning methodology to properly synchronize registry data and DNS data in the event of transitioning an existing domain name from a previous registry operator to a new registry operator. It is critical that registry information relating to the various domain names of the registrant be complete, consistent, accurate, and up to date. As such, it is critical that in transition, domain name records (both registry and DNS data) must be consistent and up to date in order to prevent undesirable expense, complication and worst-case loss of domain name rights. The coordination involved for domain transitioning in today's multi-TLD universe is becoming increasingly complex, due to the increased availability in the number and variety of domain names.

BRIEF DESCRIPTION OF THE DRAWINGS

Exemplary embodiments of the invention will now be described in conjunction with the following drawings, by way of example only, in which.

SUMMARY

Figure 1:
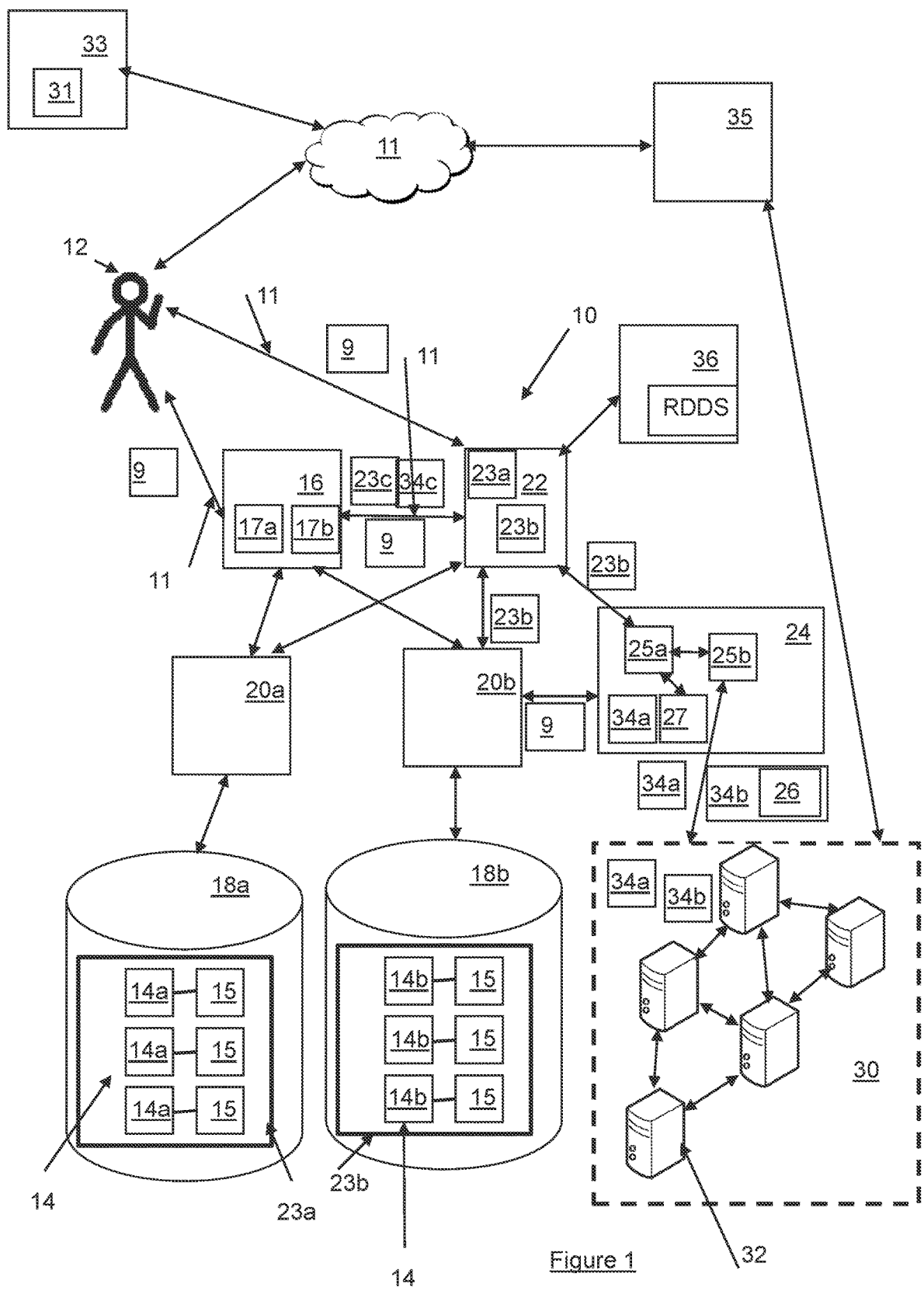
FIG. 1 is a block diagram of components of a domain name transition system.

In various embodiments, it is an advantage of the present invention to provide a system and method for transitioning domain names to obviate or mitigate at least some of the above presented disadvantages.

Accordingly, an aspect provided are embodiments of safe mode transitioning of a domain, such as a TLD, such that the safe mode transitioning includes interaction with a plurality of registrars associated with the existing domain. The plurality of registrars are used to collect existing registry data therefrom, as well as to interact with the published new registry (and/or new zone) data of the new TLD using a first publication mode and a second publication mode. In embodiments, the existing TLD has a non operational zone. In embodiments, the existing TLD has an operational zone.

A first aspect provided is a method for transitioning an existing TLD from an existing registry operator to a new TLD of a new registry operator, the new TLD subsequently accessible over a communications network, the existing TLD having a non-operational zone, the method including the steps of: collecting existing registry data for the existing TLD from a plurality of registrars associated with one or more domain names of the existing TLD, such that each of the plurality of registrars provides a respective portion of the existing registry data; aggregating the respective portions of the existing registry data to generate new registry data for the new TLD; using the new registry data to generate new zone data for the new TLD, the new registry data containing at least some data representative of existing zone data for the existing TLD; publishing in a first mode the new zone data to nodes of a DNS (Domain Name system), the first mode disabling write functionality of the new zone data while facilitating querying of the new zone data; and publishing in a second mode the new zone data to the nodes of the DNS, the second mode facilitating the write functionality of the new zone data, including said querying and updating of the new zone data, the new zone data of the second mode considered as an operational zone; wherein the new zone data and the new registry data in the first mode as well as in the second mode are accessible by the plurality of registrars over the communications network.

Further, when in the first mode, a status of the new TLD is non operational by inhibiting updates to the new zone data. Further, the system receives updates to the new zone data from one or more of the plurality of registrars and republishing the new zone data including the updates. Further, the system receives updates to the new registry data from one or more of the plurality of registrars and store the new registry data including the updates. Further, querying and the updating utilizes respective Extensive Provisioning Protocol (EPP) commands. Further, the system by generating the new zone data includes provisioning DNSSEC signing key settings on a DNSSEC signing system and generates one or more signatures for the new zone data in order to provide the new zone data as a signed zone. Further, the existing registry data includes at least one of contact data and domain status data. Further, the existing zone data is collected from another data source other than the plurality of registrars. Further, the generating of one or more signatures includes generating one or more new public keys, such that the existing zone data contains one or more existing public keys, such that the one or more signatures includes the one or more new public keys. Further, the new zone data includes new root zone data. Further, the existing registry data includes administration data for a plurality of registrants for domain names of the existing TLD; and the new registry data is stored in a new registry database for the new TLD. Further, the system cross checks the existing registry data with the existing zone data in order to identify one or more conflicts. Further, the system supplements the existing registry data collected from the plurality of registrars with additional registry data obtained from at least one of an existing registry database of the TLD and a current operator of the TLD. Further, the system reconciles the additional registry data with the existing registry data. Further, the existing registry data is stored as offline backup data, wherein the offline backup data is escrow data and the existing TLD is a gTLD.

A second aspect provided is a method for transitioning an existing TLD from an existing registry operator to a new TLD of a new registry operator, the new TLD subsequently accessible over a communications network, the existing TLD having an operational zone, the method including the steps of: collecting existing registry data for the existing TLD from a plurality of registrars associated with one or more domain names of the existing TLD, such that each of the plurality of registrars provides a respective portion of the existing registry data; aggregating the respective portions of the existing registry data to generate new registry data for the new TLD; using the new registry data to generate new zone data for the new TLD, the new registry data containing at least some data representative of existing zone data of the operational zone for the existing TLD; publishing in a first mode the new zone data to nodes of a DNS (Domain Name System) as an unsecured zone, the first mode disabling write functionality of the new zone data while facilitating querying of the new zone data; waiting for a hold down period to expire; generating one or more signatures for the new zone data in order to provide the new zone data as a secured zone; publishing in a second mode the new zone data to the nodes of the DNS, the second mode facilitating the write functionality of the new zone data, including said querying and updating of the new zone data, the new zone data of the second mode considered as a new operational zone for the new TLD and including the one or more signatures; wherein the new zone data and the new registry data in the first mode as well as in the second mode are accessible by the plurality of registrars over the communications network.

Further, the system by generating the new zone data includes provisioning DNSSEC signing key settings on a DNSSEC signing system and generates the one or more signatures for the new zone data in order to provide the new zone data as a signed zone. Further, the system by generating one or more signatures includes generating one or more new public keys, such that the existing zone data contains one or more existing public keys, such that the one or more signatures includes the one or more new public keys. Further, the system accesses one or more existing public keys of the existing zone data by implementing corresponding one or more DNS queries; wherein the one or more existing public keys are utilized in the step of generating the one or more signatures, the one or more signatures including new delegation signer records. Further, the system accesses one or more new public keys of the new zone data by implementing corresponding one or more DNS queries; wherein the one or more new public keys are utilized in the step of generating the one or more signatures, the one or more signatures including new delegation signer records.

A third aspect provided is a method for transitioning an existing TLD from an existing registry operator to a new TLD of a new registry operator, the new TLD subsequently accessible over a communications network, the existing TLD having an operational zone, the method including the steps of: collecting existing registry data for the existing TLD from a plurality of registrars associated with one or more domain names of the existing TLD, such that each of the plurality of registrars provides a respective portion of the existing registry data; aggregating the respective portions of the existing registry data to generate new registry data for the new TLD; accessing the existing zone data in order to generate new zone data for the new TLD, the existing zone data containing at least some data facilitating the operational zone for the existing TLD; publishing in a first mode the new zone data to nodes of a DNS (Domain Name System), the first mode disabling write functionality of the new zone data while facilitating querying of the new zone data; publishing in a second mode the new zone data to the nodes of the DNS, the second mode facilitating the write functionality of the new zone data, including said querying and updating of the new zone data, the new zone data of the second mode considered as a new operational zone for the new TLD; wherein the new zone data and the new registry data in the first mode as well as in the second mode are accessible by the plurality of registrars over the communications network.

Further, the system by publishing in the first mode is as a secured zone, the first mode disabling write functionality of the new zone data while facilitating querying of the new zone data, the new zone data containing one or more signatures. Further, the system by publishing in the first mode is as an unsecured zone, the first mode disabling write functionality of the new zone data while facilitating querying of the new zone data. Further, the new zone data contains one or more signatures in order to provide the new zone data as a secured zone;

DETAILED DESCRIPTION OF THE PREFERRED EMBODIMENT(S)

Referring to FIG. 1, shown is a Top Level Domain (TLD) transfer system 10 facilitating a domain registrant 12 (e.g. TLD owner) to request 9 (e.g. over a communications network 11, i.e. the Internet) a transition of one or more current TLDs 14a from a current registry operator 20a to a new registry operator 20b, such that once transferred current TLD 14a becomes transitioned TLD 14b. It is recognized that each TLD 14a,b would have a plurality of individual domain names associated therewith. It is recognized that one or more registrars 16 were utilized by the registrant 12 to purchase and set up the current TLD(s) 14a initially, as previously coordinated with the current registry operator 20a via the registrar(s) 16 (on behalf of the registrant 12). The current registry operator 20a is responsible for storing current registry data 23a for the TLD(s) 14 in a registry database 18a. The content of the registry data 23a is meant to be maintained by the registrant 12 and the registrar(s) 16 via (e.g. Extensible Provisioning Protocol EPP) transactions conducted with the registry operator 20a in order to create/update and otherwise maintain the content of the registry data 23a in the registry database 18a during operation of the current TLDs(s) 14a). As further described below, using different scenarios as examples, the administration of the current TLD(s) 14a of the registrant 12 are transitioned from the current registry operator 20a to the new registry operator 20b, as the transitioned TLD(s) 14b, for all domain names registered in a top-level domain (TLD) as to be managed by the new registry operator 20b. This transition, depending upon the scenario utilized, is implemented by transitioning any current registry data 23a as new/transition registry data 23b (to be stored in the new registry database 18b). It is also recognized that for ease of description, where warranted, the current/transitioned TLD(s) 14a,14b can also be referred to generically as TLD(s) 14.

Referring again to FIG. 1, a registry services provider 22 can be used to coordinate the transfer of the TLD(s) 14a from the current registry operator 20a to the new registry operator 20b, as well as to coordinate via a DNS publication system 24 the required updates to DNS data 34b that reflect the contents of the new registry data 23b. As further described below, the DNS publication system 22 is used to generate and publish zone files (e.g. DNS data 34b) out to the DNS 30 (used by resolver servers 35 and DNS servers 32 to convert domain names of the TLDs 14 to IP addresses). It is recognize that the new DNS data 34b is based on data content of the new registry data 23b. Further, as described below using the different example scenarios, the registry services providers 22 can be utilized to generate the required content for the new registry data 23b, utilizing current DNS data 34a content, current registry data 23a content, and/or current registrar data 17a content relevant to the current registry data 23a.

It is recognized that the different example scenarios can be used to describe different methodologies used to collect relevant registry data 23a content and thus generate the new registry data 23b therefrom. It is also recognized that the registry services provider 22 can implement all or a subset of the registry functionality and support services on behalf of the registry operator(s) 20a, 20b. It is recognized that as the TLD 14a is existing (i.e. was owed by a previous registrant either in an operational or operational state), there will exist registrar data 17a pertaining to the TLD 14a. As such, the TLD 14a is not considered a new TLD 14, however the incumbent registry operator 20a of the current TLD 14a is uncooperative and as such a complete and considered valid set of registry data 23a for the TLD 14a is not available to the registry services providers 22. Therefore, an advantage of the currently configured publication system 24 is that the existing registrar data 17a (of a plurality of registrars 16) can be used to recreate the current registry data 23a, at least partially, which is then used in generation of the new/transition registry data 23b.

It is recognized that in general, registrant 12 itself can communicate directly with the registrar 16, the registry operator 20a,b and/or the registry services provider 22 for registration and/or maintenance of the TLDs 14 and/or can communicate indirectly with registry services provider 22 via registry operator 20a,b. Further, registry operator 20a,b can supply any requested respective registry 23a,b and/or maintenance information to registry services provider 22 on behalf of registrant 12.

Preferably, the communications network 11 comprises a wide area network such as the Internet, however the network 11 may also comprise one or more local area networks 11, one or more wide area networks, or a combination thereof. Further, the network 11 need not be a land-based network, but instead may comprise a wireless network and/or a hybrid of a land-based network and a wireless network for enhanced communications flexibility. For example, the communications network 11 can also include Bluetooth™ associated elements. It is recognised that the registrar 16, the registry operator 20a,b and the registry services provider 22 can be implemented on computer devices 100 (see FIG. 3) such as servers and can communicate with one another via the network 11 in client-server relationships, in order to implement transition, operation and maintenance of the TLDs 14.

Domain Names of TLDs 14

In general, a domain name under a TLD 14 is an identification string that defines a realm of administrative autonomy, authority, or control on the Internet 11, whereby domain names are formed by the rules and procedures of the DNS 30. Domain names are used in various networking contexts and application-specific naming and addressing purposes, as an Internet Protocol (IP) resource 31, such as a personal computer used to access the Internet 11, a server computer 33 hosting a web site 31, or the web site 31 itself or any other service communicated via the Internet 11. Domain names are organized in subordinate levels (subdomains) of the DNS root domain, which is referred to as the root zone, and is represented as a single dot ("."). The first-level set of domain names are the TLDs 14. Below these TLDs 14 in the DNS 30 hierarchy are the second-level and third-level domain names that are typically open for reservation by end-users who wish to connect local area networks to the Internet 11, create other publicly accessible Internet resources 31 or run web sites 31. There can be fourth- and fifth-level domains, and so on, with virtually no limitation. The registration of these domain names is usually administered by domain name registrars 16 who sell their services to the public (i.e. registrants 12). As such, the domain can be selected from the group consisting of: a TLD 14 (Top Level Domain); a second level domain (2LD); and a third level domain (3LD), for example.

Individual Internet host computers can use domain names as host identifiers, or hostnames. Hostnames can be defined as the leaf labels in the domain name system usually without further subordinate domain name space and can appear as a component in Uniform Resource Locators (URLs) for Internet resources 31 such as web sites 31 having one or more web pages 31. Domain names of TLDs 14 can also be used as simple identification labels to indicate ownership or control of a resource 31, such as realm identifiers used in the Session Initiation Protocol (SIP), DomainKeys used to verify DNS domains in e-mail systems 31, and in many other Uniform Resource Identifiers (URIs). For example, the domain name can be a component of a (URL) used to access web sites 31, for example: URL —http://www.example.info/index.html, Top-level domain name 14: info, Second-level domain name: example.info, Host name: www.example.info.

Domain names of TLDs 14 can consist of one or more parts, technically called labels, which are conventionally concatenated, and delimited by dots, such as example.info. Not that the rightmost dot, representing the root zone, is many times omitted in the vernacular—it should be implied if not specified (e.g. for the domain name expressed as "example.info", the Fully Qualified Domain Name would be "example.info."). The right-most label conveys the TLD 14, for example, the domain name www.example.info falls under the TLD .info. The hierarchy of domains descends from the right to the left label (or from left to right depending upon language considerations) in the name; each label to the left specifies a subdivision, or subdomain of the domain to the right. For example: the label example specifies a node example.info as a subdomain of the info domain, and www is a label to create www.example.info, (e.g. a subdomain or otherwise an element of the domain) of example.info. A hostname is a domain name that has at least one associated IP address. For example, the domain names www.example.info and example.info may also be hostnames, whereas the info domain is not. However, other TLDs 14, particularly country code top-level domains, may indeed have an IP address, and if so, they are also hostnames. It is recognized that hostnames can impose restrictions on the characters allowed in the corresponding domain name. A valid hostname is also a valid domain name, but a valid domain name may not necessarily be valid as a hostname.

Referring again to FIG. 1, the TLD registry database 18a,b can contain those domain names that are registered for a specific TLD 14, which is one of the domains immediately under the highest level in the hierarchical Domain Name System (DNS) 30 of the Internet 11. Practically speaking, domain names are installed in the root zone of the name space for the TLD 14 and for all domains in lower levels, the domain name is the last part of the TLD 14, that is, the last label of a fully qualified TLD 14, with the trailing dot for the root zone designation. It is recognized that there can be a number of different TLD 14 types, such as but not limited to: country-code top-level domains (ccTLD) consisting of two letter domains established for countries or territories; internationalized country code top-level domains (IDN ccTLD) which are ccTLDs in non-latin character sets (e.g., Arabic or Chinese) which are displayed in end-user applications in their language-native script or alphabet but use a Punycode-translated ASCII domain name in the Domain Name System 30; generic top-level domains (gTLD) which are top-level domains with three or more characters (e.g. GOV, EDU, COM, MIL, ORG, NET and INFO) including unsponsored top-level domains which are domains that operate directly under policies established for the global Internet community and sponsored top-level domains (sTLD) that are proposed and sponsored by private agencies or organizations that establish and enforce rules restricting the eligibility to use the TLD 14; and infrastructure top-level domain that is one domain, the Address and Routing Parameter Area (ARPA) managed on behalf of the Internet Engineering Task Force for various purposes specified in the Request for Comments publications.

Domain names of the TLDs 14 can be formed from the set of alphanumeric ASCII characters (a-z, A-Z, 0-9), but characters are case-insensitive. In addition, the hyphen can be permitted if it is surrounded by a characters or digits, i.e. it is not the start or end of a label. Labels are separated by the full stop (period) character in the textual name representation, and are limited to 63 characters in length. It is recognized that the domain names can be represented using characters based in other languages as well, including alternate formats as appropriate, as desired.

TLDs 14 can be referred to as domains and registrants 12 can be referred to as domain owners, although domain registration with the registrar 16 may not confer any legal ownership of the TLD 14, only an exclusive right of use for a particular duration of time. As such, the TLD 14 (and their associated domain names) can be considered an economic asset utilized as an identification string defining a realm of administrative autonomy, authority or control within the Internet 11.

In general, the TLD 14 can be setup or otherwise maintained/renewed for a TLD registrant 12 (e.g. domain owner) via a registrar 16 for one or more TLDs 14 available (e.g. not yet claimed) or otherwise owned in the TLD registry database 18a,b (e.g. a database of all domain names registered in a top-level domain (TLD) 14).

As further described below, the DNS data 34a,b are based on resource records 26 (e.g. Name Server name/address records, Delegation Signer records, etc.) associated with the registry data 23 of particular TLD(s) 14. It is recognized that DNSSEC related resource records 26 are not stored in the registry database 18, as these can be generated on the fly by the DNS publication system 24 using the generation instructions associated with the TLDs 14. It is also recognized that the DNS data 34a,b can include other data specific to the DNS zone itself (e.g. the zone apex).

DNS 30

In terms of importance to functioning of the Internet 11 for searching for and accessing Internet 11 resources, domain names of the TLD(s) 14 serve as names for these Internet 11 resources such as computers, networks, and services. The domain name represents an Internet Protocol (IP) resource and specifically, individual Internet host computers use domain names as host identifiers, or host names (e.g. leaf labels in the domain name system usually without further subordinate domain name space). Of importance to Internet 11 navigation, host names appear as a component in Uniform Resource Locators (URLs) for Internet 11 resources such as web sites (e.g., Afilias.info). Domain names can also be used as simple identification labels to indicate ownership or control of a resource. Such examples are the realm identifiers used in the Session Initiation Protocol (SIP), the Domain Keys used to verify DNS domains in e-mail systems, and in many other Uniform Resource Identifiers (URIs). An important function of domain names is to provide easily recognizable and memorizable names to numerically addressed Internet 11 resources. Usability of the domain names as an abstraction provides any resource to be moved to different physical locations in the address topology of the network 11, globally or locally in an intranet. Such a move usually involves changing the IP address of the resource and the corresponding translation of this IP address to and from its domain name.

Referring to FIG. 1, shown are network resources 31, which are accessible via a specified URI (over the network 11) of the server 33 incorporating the domain name associated with the specified TLD 14 maintained in domain name registry 18a,b, using an appropriate network communications protocol (e.g. SMTP, HTTP, HTTPS, etc.). For example, the network communications protocol includes rules for data formats for data exchange and rules for network address formats for data exchange that identify both the sender network 11 address and the intended receiver(s) network 11 address. In computing, the URI is a string of characters used to identify a name or a resource. Such identification enables interaction with representations of the resource over a network (typically the Internet) using the specific protocols. Schemes specifying a concrete syntax and associated protocols define each URI, such that URIs can be classified as locators (URLs), as names (URNs), or as both. A uniform resource name (URN) functions like a person's name, while a uniform resource locator (URL) resembles that person's street address. In other words: the URN defines an item's identity, while the URL provides a method for finding the item over the network 11.

Referring again to FIG. 1, shown is a Domain Name System (DNS) publication system 24 for coordinating and publishing DNS records (e.g. DNS data 34a,b including one or more Resource Record sets—RR sets) in the DNS 30 containing DNS servers 32 (e.g. Authoritative servers). Although only one DNS publication system 24 is depicted in FIG. 1, it is recognised that each of the registry operators 20a,b could have their own dedicated/separate DNS publication system 24 and associated modules 25a,b. In other words, once the TLD 14 is transitioned, and/or during the process of transition of the TLD 14, the new registry operator 20b would use their own DNS publication system 24 and thus cease to use the previous DNS publication system 24 of the current (now previous) registry operator 20a.

For example, in view of the various transition scenarios presented below, for Scenario 1, different DNS publication systems 24 may not matter, as the DNS 30 is not "live", so the current registry operator 20a is not publishing. However, for any subsequent scenarios 2,3 where the DNS 30 is "live" with registry operator 20a, it is recognised that the DNS publication systems 24 used by the different registry operators 20a,b could also be different/separate.

The DNS servers 32 provide DNS services for users of network 11 (e.g. Internet) resources 31 (e.g. as provided by a plurality of distributed web servers 33, mail servers 33, etc., as coordinated through various TLDs 14 of the network 11). It is recognized that in general, network resources 31 can be provided by one or more registry operators (e.g. via registry databases), including external links to mail servers and/or other websites based on web page return results. The distributed servers 33 can rely upon one or more resolver servers 35, by which the network user ultimately accesses network resources 31 via the DNS 30.

The DNS publication system 24 can be used for generating the new DNS data 34b, e.g. containing different DNS zone/record versions (associated with different key groups) to that of the current DNS data 34a, using the new registry data 34b of the TLD(s) 14. Once tested/validated satisfactorily, the new DNS data 34b is used by the DNS publication system 24 to replace any current DNS data 34a resident in the DNS 30, as further described below. It is recognised that the new DNS data 34b can be generated in an iterative fashion, interspersed with hold down periods, as is known in the art. As such, the new DNS data 34b can be generated and published out to the DNS 30 in an iterative fashion, in order to properly coordinate the replacement of the current DNS data 34a with the new DNS data 34b.

Accordingly, as noted herein, generated resource records 26 of the resultant new DNS data 34b are not stored in the new registry database 18b, rather the new DNS data 34b (containing the signed/unsigned resource records 26 for use in implementing the operation of the DNS 30) is published directly to the DNS 30.

The new/transition registry data 23b (pertinent to the resource records 26) can be obtained synchronously or asynchronously from a registry data source (e.g. a registry data client—i.e. a client of the server implementing the DNS publication service 24). The registry data client (of the DNS publication service 24) can be provided as the registrar 16, the registry operator 20b, and/or the registry database 18b itself (e.g. via a registry server managing transfer of registry data 23b into/out of the registry database 18b itself). It is important to note that the registry data client (e.g. network entity 16, 18b, 20b) only provides/sends the registry data 23b to the DNS publication service 24. As discussed, in general, any new DNS data 34b transmitted/published to the DNS 30 is intended to facilitate interaction between the resolver servers 35 and the DNS servers 32.

Further, it is recognized that zone data, e.g. the DNS data 34b of a TLD 14, is representative of a text file that describes a portion of the DNS 30 called a DNS zone, including the owner of the record. A zone data (e.g. the DNS data 34b) is organized in the form of resource records 26 and contains information that defines mappings between TLDs 14 and IP addresses and other resources 31, as based upon registry data 23b. For example, the DNS data 34b contains the DNS records 26 in wire transfer format, as implemented in the DNS 30. The format of zone data can be defined by a standard, with each line typically defining a single resource record 26. A line begins with a domain name, but if left blank, can default to the previously defined domain name. Following the domain name can be the time to live (TTL), the class (which is almost always "IN" for "internet" and rarely included), the type of resource record (A, MX, SOA, etc.), followed by type-specific data such as the IPv4 address for A records. Comments can be included by using a semi-colon and lines can be continued by using parentheses. There are also directives that are marked with a keyword starting with a dollar sign.

In conjunction with the DNS publication system 24, the registry operator 20b can interact with the registry service provider 22, in order to facilitate registrants 12 responsible for generating and maintaining web pages 31 (e.g. network resources 31 that can be hosted by the registrants 12) associated with the TLD 14. It is recognized that registrant 12 itself can communicate directly with registry service provider 22 for providing the registry data 23b used in generation of the DNS data 34b, and/or can have the registry data 23b communicated to the registry service provider 22 (e.g. including the DNS publication service 24) via the registry operator 20b and/or the registrar(s) 16. As such, once the DNS data 34b is published on the DNS 30, network 11 users can access network resources 31 via the network 11 and accordingly access content/services provided by the network resources 31 (e.g. web pages, web services, email services, etc.). An example of such access is the network 11 users using a web browser to navigate on the network 11 to web pages 31 and displaying of web content 31 on a user interface of the user's computer device 100 (see FIG. 3). It is recognized that the network 11 address (i.e. IP address) of the various network resources 31 are obtained by the users via the DNS data 34b implemented by the DNS servers 32.

[0043] [0070] Referring to FIG. 1, the DNS publication system 24 can have a plurality of components/modules 25a,b, e.g. configured as logical/software and/or hardware components for acting alone or in combination, for obtaining/receiving the registry data 23b from the registry services provider 22, for generating the new DNS data 34b according to a set of generation instructions 105 (see FIG. 3) and for transmitting the generated new DNS data 34b to the DNS servers 32 of the DNS 30.

In general, the DNS data 34b (aka DNS records or zone files also referred to as a Resource Record transfer/transaction 34b) are instructions that are published (e.g. transmitted or eventually transmitted to the DNS servers 32) by the DNS publication service 24 to the (authoritative) DNS servers 32. The DNS data 34b provides information about a TLD 14 including what IP addresses are associated with that TLD 14 and how to handle requests (e.g. DNS requests from the users) associated with network resources 31 for that domain names of that TLD 14. For example, a DNS record 26 can be defined as a single entry of the DNS data 34b that gives zone instructions on how to handle any given DNS 30 related request based on record type. In general, most every DNS record 26 has at least three pieces of information, namely: a Record Name; Record Value/Data; and Time to Live (TTL). These DNS records 26 consist of a series of text files written in what is known as DNS syntax. DNS syntax can be a string of characters used as commands, which instruct the DNS server 32 what to do upon receiving a DNS lookup request from the network user, for example. All DNS records 26 can also have the 'TTL', which stands for time-to-live, and indicates how often a DNS server 32 would refresh that particular DNS record 26. Accordingly, all domains are required to have at least a few essential DNS records 26 for the user 13 to be able to access the website(s) associated with the TLD 14, amongst other optional additional DNS 30 implemented functionality.

In view of the above, it is recognized that the registry data 23*b*, some of which can be obtainable from the registry database 18*b* for the particular TLD 14, can be pertinent to the resource records 26 such as but not limited to: A Records 26—which are the most basic type of DNS record and are used to point a domain or subdomain to an IP address (e.g. assigning a value to an A record is associated with an IP address to where the domain or subdomain should point and a TTL; CNAME records 26—which are used to point a domain or subdomain to another hostname, for example as a means of being able to change an IP address of a server or cluster of servers; Mail Exchanger (MX) records 26—which are used to help route email according the domain owners preference, such that the MX record itself specifies which server(s) to attempt to use to deliver mail to when this type of request is made to the domain; and TXT records—which are used to store any text-based information, for example used to hold SPF data and verify domain ownership. Other registry data 23*b* pertinent to resource records 26 can include: a NS record 26—storing the name server for a DNS entry; DNSKEY record 26—the 'DNS Key Record' contains a public key used to verify signatures; CDNSKEY record 26—a child copy of the DNSKEY record, meant to be transferred to a parent; CERT record 26—the 'certificate record' stores public key certificates; DCHID record 26—the 'DHCP Identifier' stores info for the Dynamic Host Configuration Protocol (DHCP), a standardized network protocol used on IP networks; DNAME record 26—the 'delegation name' record creates a domain alias, just like CNAME, but this alias will redirect all subdomains as well; HIP record 26—uses 'Host identity protocol', a way to separate the roles of an IP address used most often in mobile computing; IPSECKEY record 26—The 'IPSEC key' record works with the Internet Protocol Security (IPSEC), an end-to-end security protocol framework and part of the Internet Protocol Suite (TCP/IP); and SSHFP record 26—storing the 'SSH public key fingerprints', SSH stands for Secure Shell and it's a cryptographic networking protocol for secure communication over an unsecure network. In general, it is recognized that only unsigned registry data 23*b* is contained in the registry database 18*b*.

In general, is recognized that those resource records 26 of the DNS data 34*b* that are DNSSEC related, e.g. the RRSIG record 26, the DS record 26, the DNSKEY records 26, etc. may also not stored in the registry database 18*b*. As such, the resource records 26 of the DNS data 34*b* that are DNSSEC related can already be known to the DNS publication service 24 (e.g. to a signing system and/or a distribution system of the DNS publication service 24 in advance of receiving (or otherwise obtaining) the relevant registry data 23*b* from the registry database 18*b*) in order to perform the generation of the DNS data 34*b* (e.g. for the purposes of configuration of a new domain name of the TLD 14 added to the domain/zone and/or an update to the DNS data 34*b* based on registry data 23*b* related transactions implemented by the registry operator 20 on the registry data 23*b* stored in the registry database 18*b*).

Registry Data 23*a,b*

Registration and maintenance of TLDs 14 involves management of objects 15 associated with each of the domain names of the TLD(s) 14 stored in the registry database 18*a,b*. These objects 15 are populated with appropriate data based on action(s) performed on the objects 15 (e.g. update/modification, delete/del, transfer, renew, etc.). Example actions on the objects 15 are such as registration/purchase of the domain names by the registrant 12 from the registrar 16. Other example actions on the objects 15 can include management by the Registry Operator 20*a,b* of up-to-date data in the objects 15 concerning domain name and name server registrations maintained by the Registry Operator 20*a,b*, useful in verifying and providing operational stability of Registry Services and the DNS.

Example Objects 15

The specification of the content and format of this data of the objects 15 for example TLD(s) 14 (recognizing that different TLDs 14 can have a different set of parameters—e.g. for ccTLDs 14) can be such as but not limited to:

1. Registrar objects. The registrar object corresponds to a single registrar. It includes the following data:
Registrar ID (conforming to the IANA registrar-ids registry)
Contact ID of Registrar
Registrar Administrative Contacts
Registrar Technical Contacts
Registrar Billing Contacts
Registrar URL
Registrar Creation Date
Registrar Last Updated Date 2. Contact objects. The contact object corresponds to a single contact (whether registrant, administrative, technical or billing contact). The contact object includes the following data:
Contact ID
Contact Name
Contact Organization
Contact Address, City, State/Province, Country
Contact Postal Code
Contact Phone, Fax, E-mail 3. Nameserver objects. A nameserver object corresponds to a single registered nameserver. The nameserver object includes the following data:
Name Server ID
Name Server Host Name
Name Server IP Addresses if applicable
Current Registrar
Name Server Creation Date
Name Server Last Updated Date 4. Domain objects. The domain object corresponds to a single Registered Name. Each domain object includes the following data:
Domain ID
Domain Name
Sponsoring Registrar
Domain Status
All contact information (including all details) with at least one each of:
 Registrant
 Administrative
 Technical
 Billing
All nameservers associated with this domain
Domain Registration Date
Domain Expiration Date
Domain Last Updated Date It is recognized that registrant 12 itself can communicate directly with the registrar 16, the registry operator 20*a,b* and/or the registry services provider 22 for registration and/or maintenance information used in registration and maintaining of the TLDs 14 via coordinating the data content of the objects 15, and/or can communicate registration and/or maintenance information indirectly with registry services provider 22 via the registry operator 20a,b. Further, the registry operator 20a,b can supply any requested registration and/or maintenance information to the registry services provider 22 on behalf of registrant 12 and/or registrar(s) 16. As such, the registration and/or maintenance information is considered data used to populate the objects 15 based on actions (e.g. EPP transactions such as but not limited to update, delete, transfer, renew, etc.) performed on the objects 15 as associated with the TLD(s) 14.

Example Actions

An action is defined as an operation on an object 15 unique to each of the plurality of domain names of the TLDs 14. An example action can be assigning the domain names to a new domain name registrant 12. Alternative actions can include actions such as but not limited to check, info/status, update/mod, delete/del, transfer, and/or renew. The action can be based on a protocol such as Extensible Provisioning Protocol (EPP) or Registry Registrar Protocol (RRP). The Extensible Provisioning Protocol (EPP) is a flexible protocol designed for allocating objects within registries over the Internet. EPP provides a robust and flexible protocol that facilitates transaction communications between domain name registry service providers 22, registry operators 20a,b, and domain name registrars 16. These transactions are used whenever a domain name is acted upon using actions such as to effect data content of the domain name objects 15 to reflect registered, transferred, renewed or otherwise amended domain names. As such, the EPP protocol is used to implement an order (request action on an object) and fulfilment (perform and report result of object when acted upon) system. Specified in XML, EPP provides four basic service elements: a greeting, commands (e.g. actions), responses (e.g. to the actions effecting changes to data content of the objects 15 associated with the actions), and an extension framework that supports future definition of managed objects 15 and the relationship of EPP protocol requests (e.g. actions) and responses to those objects 15. It is recognised that actions of EPP are expressed as XML, a structured, text-based format, such that communication over the network 11 of the actions between entities 16,18,20a,b, 22 can be specified over TCP communication messaging and/or other transport communication messaging such as BEEP, SMTP, or SOAP. The registry databases 18a,b can also contain a transaction log/history (e.g. EPP) containing all operations (a consequence of actions) executed on the objects 15 of the domain names, such that the log/history indicates the domain name by domain name ID along with details of the operation(s) (e.g. time of transaction, success of transaction, type of operation, etc.).

In view of the above, as part of the transitioning process for the TLD(s) 14 (each containing a plurality of individual domain names) from the current registry operator 20a to the new registry operator 20b, it is the responsibility of the registry services provider 22 to collect the pertinent content and thus generate the new registry data 23b. Once generated, the new registry data 23b is communicated to the new registry operator 20b for storing in the new registry database 18b. Further, once generated, the new registry data 23b can be made available to the DNS publication system 24 used by the new registry operator 23b for use in generating the new DNS data 34b (relevant to the transitioned TLD 14b). It is recognised that the physical databases 18a,b can be the same or different databases, as desired.

Transition Scenario 1

Figure 2A:
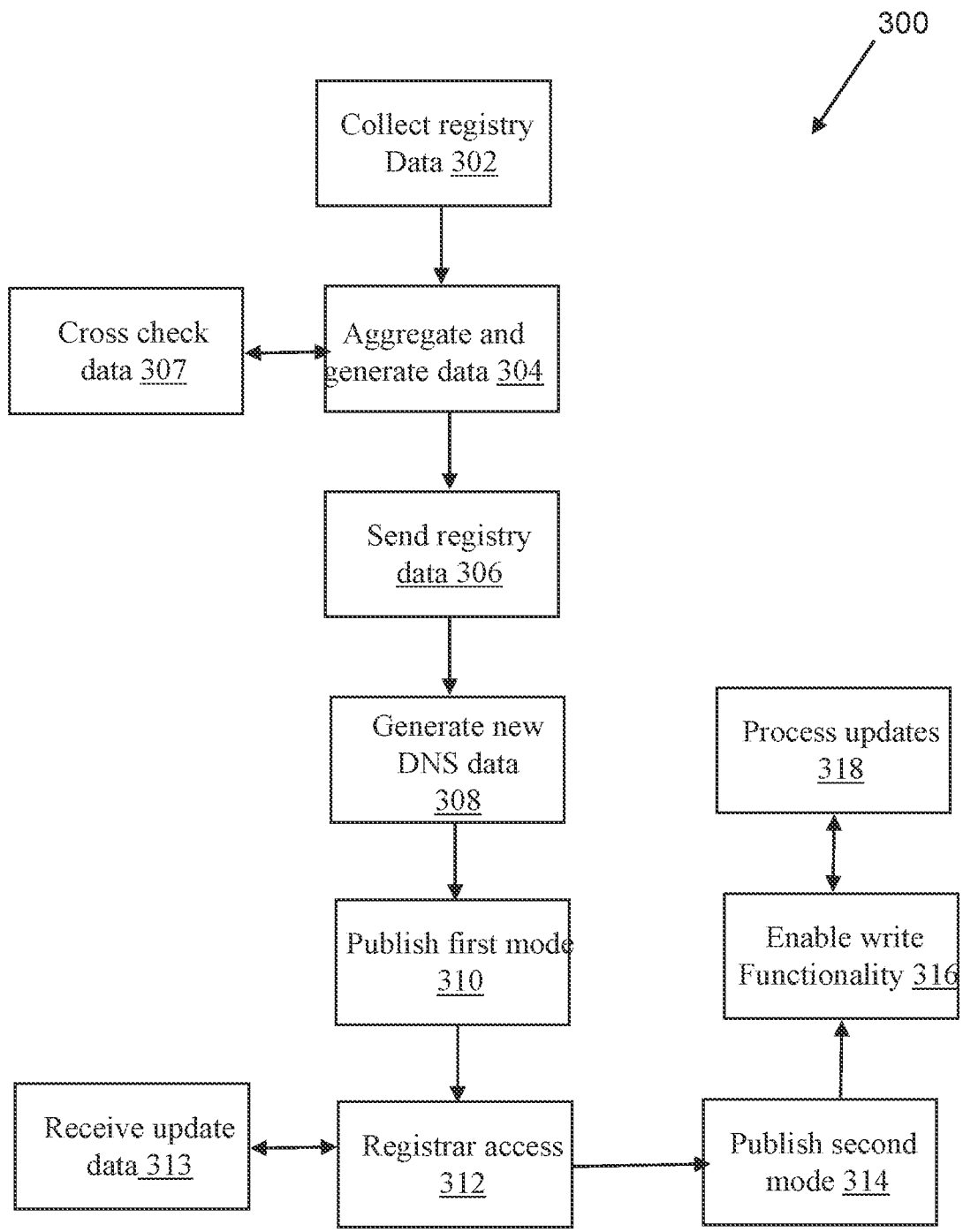
FIG. 2a is a flowchart of an example implementation for the system of FIG. 1.

Referring to FIGS. 1 and 2a, in example transition scenario 1, the base constraints are that some or all of the content of the current registry data 23a is either missing or unavailable from the existing registry operator 20a (e.g. due to a bankruptcy event, etc.). Therefore, it is recognised that "missing" and/or "unavailable" data can mean that anywhere from 0-99% of the data is not available. In other words, at least some of (i.e. greater than 0% and less than 100%) the registry data 23a and/or the zone data 34a is missing or otherwise suspect. Further, as part of the scenario 1 constraints, the zone is not live, i.e. the DNS data 34a is not active/enabled in the DNS 30 and as such the TLD 14a associated with the registry database 18a can be considered to have a non-operational zone. Accordingly, as at least some of the data 23a, 34a is missing, scenario 1 will include a process of requesting/receiving data content of the registry data 23a from the registrar(s) 16 associated with the TLD (s) 14a under transition.

Referring to FIG. 2a, shown is a method 300 for transitioning current registry data 23a for establishing the transitioned TLD 14b as accessible over a communications network 11, the current registry data 23a representing a current TLD 14a (as assigned to the current registry operator 20a) initially having a non-operational zone.

A first step 302 includes the registry services provider 22 collecting existing/current registry data 23a content from a plurality of registrars 16 (e.g. one or more registrars 16 recognizing that the registrar(s) 16 shown in FIG. 1 can represent one or more individual registrars 16) associated with one or more domain names of the TLD 14a, such that each of the plurality of registrars 16 provides a respective portion of the complete registry data 23a for the TLD 14a. As discussed above, the current registry data 23a can include any of the content associated with the registry objects 15, provided as example data 23a content. It is recognised that even in the case where the current TLD 14a associated with the registry database 18a is considered non-operational, the registrar(s) 16 would still have available registry data 23a (in their registrar data 17a) associated with the current TLD 14a, as they obtained when the current TLD 14a was first created (e.g. purchased in previous transaction(s) between the registrant 12 and the registrar(s) 16) and/or as was generated/published when the current TLD 14a was operational in the DNS 30 (i.e. operational DNS data 34a utilized by users of the TLD 14a via interaction with the DNS 30 as discussed above). In this manner, the registry services provider 22 can request what registry data 23a content the registrar(s) 16 have in their data records that is associated with the current TLD 14a, i.e. the registrar data 17a, and receive same via a network interface 101 (see FIG. 3).

Further to the above, it is recognised that the current registry data 23a can include at least one of contact data and domain status data. Further to the above, the current registry data 23a can include administration data for a plurality of registrants 12 for domain names of the TLD 14a; and the new registry data 23b, once generated, is stored in the new registry database 18b for the TLD 14b. Further to the above, the collected registry data 23a collected from the plurality of registrars 16 can be supplemented with additional registry data 23a obtained from other data sources such as an existing registry database 18a of the registry operator 20a. Further to the above, the current registry data 23a can be obtained by the registry services provider 22 from another data source such as a backup database (not shown), stored as offline backup data. For example, the offline backup data can be escrow data (e.g. for the TLD 14a as a gTLD). Further to the above, the current registry data 23a is collected from the plurality of registrars 16 and additional registry data 23a can be obtained from (e.g. extracted from) another data source such as an existing zone file of the TLD 14a.

As part of the first step 302, the current registry data 23a could be collected using from another data source such as RDDS (e.g. WHOIS data as available on the network 11). RDDS stands for Registry Registration Data Directory Services, such that the current registry data 23a can be obtained from an RDDS database (e.g. as part of the registry database 18a). For example, Registration Data Directory Services can refer to a collective of WHOIS and Web based WHOIS services. Also know as a WHOIS directory. The WHOIS can be defined as a database containing contact and registration information for domain names of the TLD 14a. For example you can find out who registered the domain names of the TLD 14a, with what registrar 16 and even contact details so you can get in touch. The WHOIS database can consist of a set of text records for each resource. These text records can consist of various items of information about the resource itself, and any associated information of assignees, registrants, administrative information, such as creation and expiration dates, mailing address, phone number and e-mail address of those owning or administrating the domain name of the TLD 14, as made publicly available through the "WHOIS" directories.

At step 304, the registry services provider 22 aggregates the respective portions of the current registry data 23a (e.g. collected from the registrar(s) 16 and optionally any other data sources as discussed above) and generates a set of the new registry data 23b suitable for storage in the new registry database 18b. The new registry data 23b could be cross checked or otherwise validated as further described below, in validation step 307. For example, it is recognised that the validation step 307 could come before generation of the new DNS data 34b, as the new registry data 23b would be used as a basis for the generation of the new DNS data 34b.

At step 306, the registry services provider 22 communicates with the DNS publication service 24 (e.g. a module 25a,b that is part of the registry services provider 22) and provides data of the new registry data 23b relevant to generation of the new DNS data 34b. For example, the new registry data 23b could contain some data content representative of the old (e.g. current) zone data of the TLD 14a.

At step 308, the DNS publication service 24 uses the new registry data 23b, along with DNSSEC signing key settings 27 of a DNS signing system 25a, to generate new DNS data 34b including one or more signatures in order to provide the new DNS data 34a as a signed zone.

For example, the step of generating the one or more signatures can include generating one or more new public keys, such that the current zone data 23a contains one or more existing public keys, such that the one or more signatures of the new DNS data 34b includes the one or more new public keys suitable for the new/transitioned TLD 14b. It is recognised that the existing public keys of the TLD 14a are different than the new public keys of the TLD 14b. Further, the new DNS data 34b can include new root zone data. Further, the one or more signatures can include delegation signer records 26.

At step 310, the DNS publication service 24 uses a publication system 25b to publish in a first mode the new DNS data 34b to the nodes (e.g. servers 32) of the DNS 30 as the signed zone for the TLD 14b (including the one or more signatures). Further, as part of the publication in the first mode, the publication system 25b disables (or otherwise restricts) write functionality of the new DNS data 34b while at the same time facilitating querying 9 of the new DNS data 34b by the registrars 16 at step 312. Disabling write functionality can also be described as "permitting read-only operations/functionality". For example, it can be implemented via registry configurations by disabling all operations that write/update the registry database 18b (for the registry data 23b) and/or generate/publish updates/changes to the DNS data 34b sent to the DNS 30.

Figure 3:
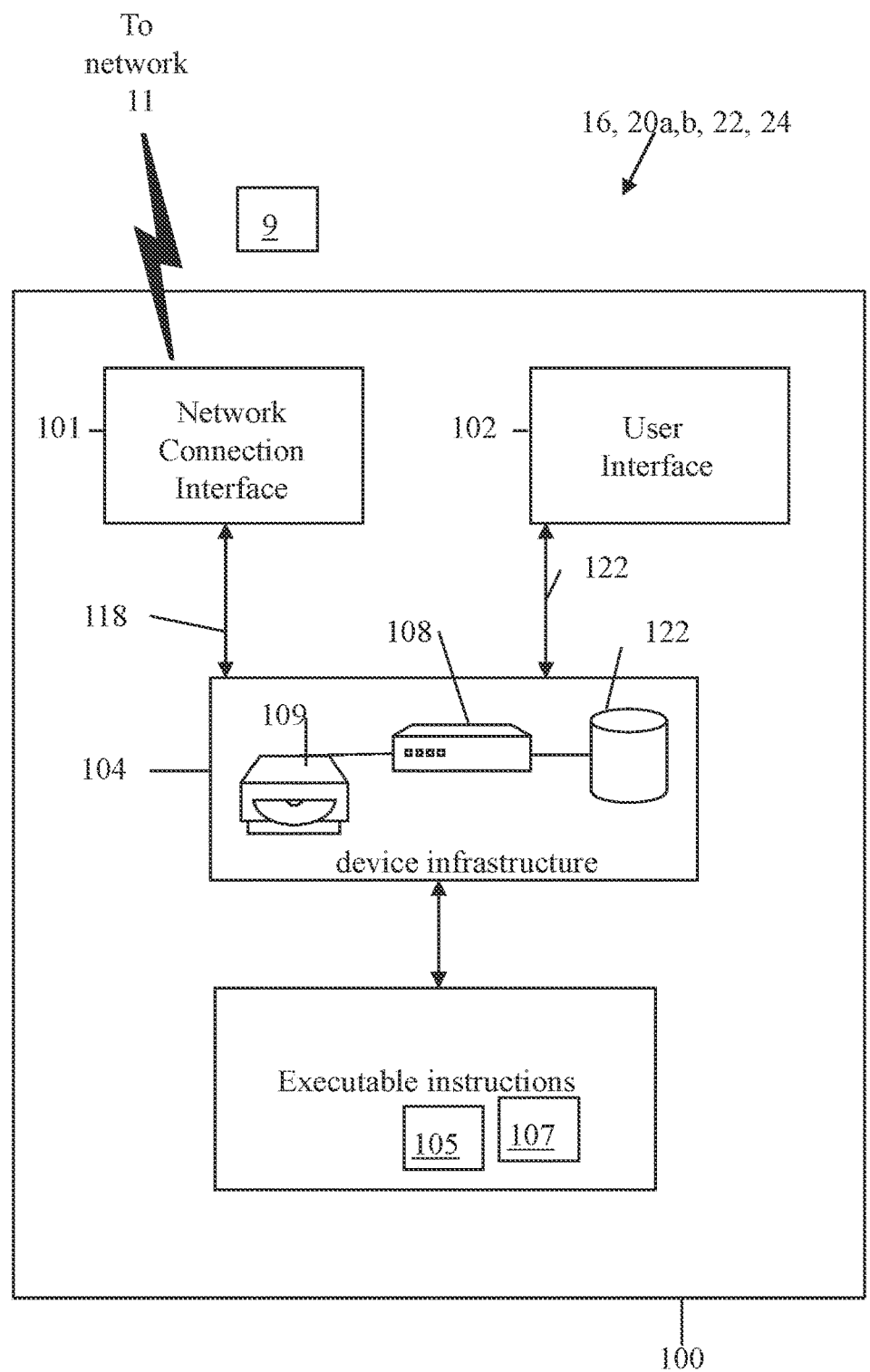
FIG. 3 is an example configuration of a computer device hosting the client or server devices utilized in FIG. 1.

In other words, The DNS publication system 24 allows access to the DNS data 34b by the registrars 16 and others over the network 11, via the network interface 101—see FIG. 3, while at same time blocks or otherwise inhibits changes/updates being generated and published to the new DNS data 34b. For example, one mode of inhibiting real-time updates (e.g. write capability) of the new DNS data 34b would be for the DNS publication system 24 to temporarily reject or otherwise hold in abeyance any processing of received update/change requests 9 (at step 313) for the DNS data 34b, for example as received from the registry operator 20b and/or the registrar(s) 16 via the network interface 101 In other words, the DNS publication system 24 would withhold any update/change requests 9 from the system(s) 25a,b. In another example, the DNS publication system 24 could inhibit updates (e.g. write capability) of the new DNS data 34b by allowing receipt of the update/change requests 9 (at step 313) while at the same time disabling operation of the signing system 25a and/or publication system 25b, thereby not allowing the system(s) 25a,b to act on any received update/change requests 9 for the DNS data 34b. It is recognised that while in the first mode, the TLD 14b would be considered as having a non-operational zone. In other words, while the new DNS data 34b is published in the first mode, the new DNS data 34b would not be usable by the servers 32, 35 to navigate the DNS 30 (i.e. satisfy DNS requests).

While allowing access to the DNS data 34b at step 312, the registry services provider 22 could receive update/change data content at step 313 from the registrars 16, the update/change data content relevant to the new DNS data 34b. During step 312, the registry services provider 22 gives the registrars 16 time to check/confirm the new DNS data 34b content with their own records (i.e. registrar data 17b). As such, if the registrar(s) 16 determine that their registrar data 17b for the transitioned TLD 14b (as defined by the new DNS data 34b and new registry data 23b for that matter) does not match (e.g. does not reconcile), then the registrar 16 could send update/change request(s) 9 to the registry services provider 22 representative of the data content of the registrar data 17b.

Once an appropriate amount of time has passed during step 312, the DNS publication service 24 would publish in step 314, in a second mode, the new DNS data 34b to the nodes of the DNS 30. Once published in the second mode, at step 316 the service 22,24 enables 316 write functionality of the new DNS data 34b as well as the new registry data 23b (thus allowing the receipt and processing of the update/change requests 9 from the registrars 16 and/or registrants 12 in real time (for example)—e.g. via EPP requests containing EPP commands). In other words, the service(s) 22, 24 would allow for processing of any received EPP commands 9 (e.g. via the systems 25a,b and/or the EPP server of the registry operator 20b) at step 318. For example, the service (s) 22, 24 would not hold in abeyance any received requests 9. For example, the service(s) 22, 24 would not restrict operation of the system 25a,b from acting on the commands contained in any received requests 9 at step 318.

The second mode publication of step 314 therefore facilitates the write functionality of the new DNS data 34b in real time, including operation of the systems 25*a,b* in response to received update/change requests 9 of the new DNS data 34*b* to reflect actions (see examples as provided above wrt EPP transactions) contained in the update/change requests 9, as provided for in steps 316, 318. It is recognised that in the second mode, the new DNS data 34*b* would be available for use by the servers 32,35 to implement operation of the TLD 14*b* in the DNS 30, in other words the new DNS data 34*b* of the second mode would be considered as an operational zone for the TLD 14*b*. For example, at step 318 once write functionality was enabled at step 316, the service 22,24 and/or the registry operator 20*b* would receive update/change requests 9 (e.g. containing EPP commands) to add/delete/change/modify any of the objects 15 associated with the data 23*b*,34*b*. In the event the received update/change requests affect the content of the DNS data 34*b*, the service 24 would be informed (or otherwise recognize) the required affects and thus regenerate and republish the DNS data 34*b* to the DNS 30 (e.g. using the systems 25*a,b*).

It is also recognised that the registrars 16 would have access via the network 11 to the new registry data 23*b* at step 312. Therefore, for the appropriate period of time during the first mode, the registrars 16 could also query 9 the new registry data 23*b*. Further, similar to the new DNS data 34*b*, any received updates/changes to the new registry data 23*b* would be inhibited by the registry services provider 22 (i.e. changes to the data content of the new registry database 18*b* could be inhibited during the first mode). During step 312, the registry services provider 22 gives the registrars 16 time to check/confirm the new registry data 23*b* content with their own records (i.e. registrar data 17*b*). As such, if the registrar(s) 16 determine that their registrar data 17*b* for the transitioned domain 14*b* (as defined by the new registry data 23*b* and new DNS data 34*b* for that matter) does not match (e.g. does not reconcile), then the registrar 16 could send update/change request(s) 9 to the registry services provider 22 representative of the data content of their registrar data 17*b*.

In view of the above, if it is determined by the registry services provider 22 that updates/changes to the registry data 23*b* is required (e.g. due to feedback/update requests 9 received from the registrars 16 received as respective Extensive Provisioning Protocol (EPP) commands by example) before publishing the new DNS data 34*b* in the second mode, then the registry services provider 22 could at step 316 update the content of the registry data 23*b* in the new registry database 18*b* before publishing the DNS data 34*b* in the second mode. Similarly, if it is determined by the registry services provider 22 that updates/changes to the DNS data 34*b* are required (e.g. due to feedback/update requests 9 received from the registrars 16 received as respective Extensive Provisioning Protocol (EPP) commands by example), then the registry services provider 22 could at step 318 update the content of the DNS data 34*b* (e.g. based on updates/changes to the registry data 23*b* in the new registry database 18*b*) after publishing the DNS data 34*b* in the second mode. It is recognised that the update requests 9 from the registrars 16 contain update (e.g. additional) data 23*c*, 34*c* determined as not present in the published data 23*b*,34*b*, as inspected/accessed by the registrars 16 during step 312 as well as once published in step 314. The update data 23*c*, 34*c* would be used by the registry services provider 22 to add to, delete from, or otherwise correct (e.g. change/modify) the generated data 23*b*,34*b* as published during the first mode. It is recognised that any additions/deletions/changes/modifications to the data 23*b*,34*b* as published in the first mode would be incorporated in the data 23*b*,34*b* before (or after as the case may be) publishing in the second mode.

As such, as discussed above, the new DNS data 34*b* and the new registry data 23*b* in the first mode as well as in the second mode are accessible by the plurality of registrars 16 over the communications network 11. Further, it is recognised that zone files (e.g. DNS data 34*a*,34*b*) only capture domain name and host related data, but not contact data, domain status, and any domain lifecycle data. RDDS data can contain domain status, domain lifecycle, and sometimes contact information (depending on GDPR policies). It is also recognised that the contact data, domain status, and any domain lifecycle data can come (e.g. in part, during the aggregation of the registrar data 17*a*) from the registrars 16 themselves, as part of step 302 for example.

In terms of the validation step 307, the method 300 can include crosschecking, e.g. reconciliation, of the registry data 23*b* with the RDDS data (e.g. provided by third party RDDS data providers 36) and/or any existing zone data 34*a*. The step 307 for cross checking is to identify whether there are one or more conflicts between the new registry data 23*b* with the new zone data 34*b*. Further, the compatibility of the existing zone data 34*a* with the existing registry data 23*a* can be performed, in order to determine if there are any conflicts present between the registry data 23*a* and the existing zone data 34*a*. The crosschecking between the registry data 23*a* and the existing zone data 34*a* can be performed prior to using the registry data 23*a* and the existing zone data 34*a* in generation of the new registry data 23*b* and the new zone data 34*b*.

As an example of the cross checking, a verification process A can be used if RDDS data is available (e.g. verify collected data with RDDS data). In terms of Verification A, the registry services provider 22 performs registry data 23*a,b* reconciliation with publicly available services 36 offering the RDDS data. Examples of verification A include: 1) domain name of the TLD 14 exists in the registry data 23*a* but does not exist in the RDDS data, 2) domain name of the TLD 14 exists in the registry data 23*b* but does not exist in the RDDS data, 3) domain name of the TLD 14 exists in both data (data 23*a* and RDDS data), however there is a mismatch in information (e.g. the names and/or other object 15 information are not completely matching), and 4) domain name of the TLD 14 exists in both data (data 23*b* and RDDS data), however there is a mismatch in information (e.g. the names and/or other object 15 information are not completely matching). The information checked can include object information 15 such as but not limited to; contact information, registrar sponsorship, domain attributes such as registration/expiry date, domain status, and/or name server name.

As an example of the cross checking, a verification process B can be used if existing zone data 34*a* is available (e.g. verify collected data with DNS data 34*a*). In terms of Verification B, the registry services provider 22 performs registry data 23*a,b* reconciliation with any available DNS data 34*b*. Examples of verification B include: 1) Domain name of the TLD 14 exists in the registry data 23*a* but does not exist in the zone data 34*a*, 2) Domain name of the TLD 14 exists in the registry data 23*b* but does not exist in the zone data 34*a*, 3) Domain name of the TLD 14 exists in the zone data 34*a* but does not exist in the registry data 23*a*, 4) Domain name of the TLD 14 exists in the zone data 34*a* but does not exist in the registry data 23*b*, 5) Domain name 14 exists in both data 23*a*,34*a*, however a mismatch in information is identified, such as nameservers/IP, 6) Domain name of the TLD 14 exists in both data 23*b*,34*a*, however a mismatch in information is identified, such as nameservers/

IP, 7) Domain name of the TLD 14 status in registry data 23*a* reflects certain functionality expected in zone data 34*a*, however zone data 34*a* does not reflect the appropriate function, and 8) Domain name of the TLD 14 status in registry data 23*b* reflects certain functionality expected in zone data 34*a*, however zone data 34*a* does not reflect the appropriate function. The information checked can include object information 15 such as but not limited to; contact information, registrar sponsorship, domain attributes such as registration/expiry date, domain status, and/or name server name.

In view of the above, the preforming of verification A and/or verification B can also be performed on any of the update data 23*c*, 34*c* received from the registrars 16.

Transition Scenario 2

Figure 2B:
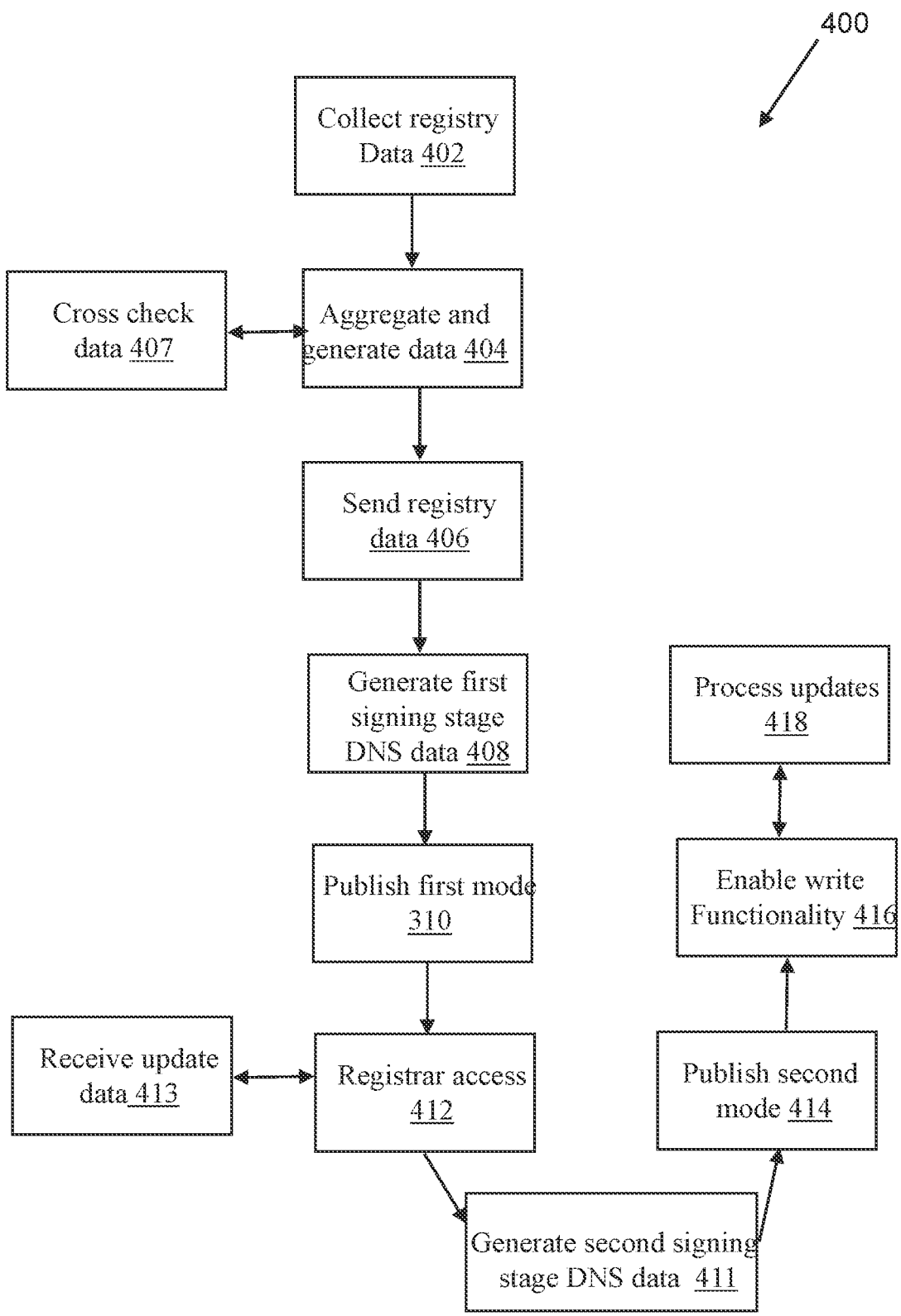
FIG. 2b is a flowchart of a further example implementation for the system of FIG. 1.

Referring to FIGS. 1 and 2*b*, in example transition scenario 2 which is considered as a new DNSSEC installation, the base constraints are that some or all of the content of the current registry data 23*a* is either missing or unavailable from the existing registry operator 20*a* (e.g. due to a bankruptcy event, etc.). Therefore, it is recognised that "missing" and/or "unavailable" data can mean that anywhere from 0-99% of the data is not available. In other words, at least some of (i.e. greater than 0% and less than 100%) the registry data 23*a* and/or the zone data 34*a* is missing or otherwise suspect.

Further, as part of the scenario 2 constraints, the zone is actually live, i.e. the DNS data 34*a* is active/enabled in the DNS 30 and as such the TLD 14*a* associated with the registry database 18*a* can be considered to have an operational zone, however access to the zone data 34*a* is unavailable to the registry service provider 22 for use in the transition process of TLD 14*a* to TLD 14*b* (i.e. zone data 34*a* transfer is not enabled and hence a new DNSSEC installation is performed instead for the live zone). Accordingly, as at least some of the data 23*a*, 34*a* is missing, transition scenario 2 will include a process of requesting/receiving data content of the registry data 23*a* from the registrar(s) 16 associated with the TLD(s) 14*a* under transition.

Referring to FIG. 2*b*, shown is a method 400 for transitioning current registry data 23*a* for establishing the transitioned TLD 14*b* as accessible over a communications network 11, the current registry data 23*a* representing a current TLD 14*a* (as assigned to the current registry operator 20*a*) initially having an operational zone.

A first step 402 includes the registry services provider 22 collecting existing/current registry data 23*a* content from a plurality of registrars 16 (e.g. one or more registrars 16 recognizing that the registrar(s) 16 shown in FIG. 1 can represent one or more individual registrars 16) associated with one or more domain names of the TLD 14*a*, such that each of the plurality of registrars 16 provides a respective portion of the complete registry data 23*a* for the TLD 14*a*. As discussed above, the current registry data 23*a* can include any of the content associated with the registry objects 15, provided as example data 23*a* content. It is recognised that even in the case where the DNS data 34*a* of the current TLD 14*a* (associated with the registry database 18*a*) is considered operational, the registrar(s) 16 would have available registry data 23*a* (in their registrar data 17*a*) associated with the current TLD 14*a*, as they obtained when the current TLD 14*a* was first created (e.g. purchased in previous transaction(s) between the registrant 12 and the registrar(s) 16) and/or as was generated/published when the current TLD 14*a* was operational in the DNS 30—i.e. operational DNS data 34*a* utilized by users of the TLD 14*a* via interaction with the DNS 30 as discussed above). In this manner, the registry services provider 22 can request what registry data 23*a* content the registrar(s) 16 have in their data records that is associated with the current TLD 14*a*, i.e. the registrar data 17*a*, and receive same via a network interface 101 (see FIG. 3).

Further to the above, it is recognised that the current registry data 23*a* can include at least one of contact data and domain status data. Further to the above, the current registry data 23*a* can include administration data for a plurality of registrants 12 for domain names of the TLD 14*a*; and the new registry data 23*b*, once generated, is stored in the new registry database 18*b* for the TLD 14*b*. Further to the above, the collected registry data 23*a* collected from the plurality of registrars 16 can be supplemented with additional registry data 23*a* obtained from other data sources such as an existing registry database 18*a* of the registry operator 20*a*. Further to the above, the current registry data 23*a* can be obtained by the registry services provider 22 from another data source such as a backup database (not shown), stored as offline backup data. For example, the offline backup data can be escrow data (e.g. for the TLD 14*a* as a gTLD).

As part of the first step 402, the current registry data 23*a* could be collected using from another data source such as RDDS (e.g. WHOIS data as available on the network 11). RDDS stands for Registry Registration Data Directory Services, such that the current registry data 23*a* can be obtained from an RDDS database (e.g. as part of the registry database 18*a*). For example, Registration Data Directory Services can refer to a collective of WHOIS and Web based WHOIS services. Also know as a WHOIS directory. The WHOIS can be defined as a database containing contact and registration information for domain names of the TLD 14*a*. For example you can find out who registered the domain names of the TLD 14*a*, with what registrar 16 and even contact details so you can get in touch. The WHOIS database can consist of a set of text records for each resource. These text records can consist of various items of information about the resource itself, and any associated information of assignees, registrants, administrative information, such as creation and expiration dates, mailing address, phone number and e-mail address of those owning or administrating the domain name of the TLD 14, as made publicly available through the "WHOIS" directories.

At step 404, the registry services provider 22 aggregates the respective portions of the current registry data 23*a* (e.g. collected from the registrar(s) 16 and optionally any other data sources as discussed above) and generates a set of the new registry data 23*b* suitable for storage in the new registry database 18*b*. The new registry data 23*b* could be cross checked or otherwise validated as further described below, in validation step 407. For example, it is recognised that the validation step 407 could come before generation of the new DNS data 34*b*, as the new registry data 23*b* would be used as a basis for the generation of the new DNS data 34*b*.

At step 406, the registry services provider 22 communicates with the DNS publication service 24 (e.g. a module 25*a,b* that is part of the publication system 24—e.g. as operated by the registry services provider 22) and provides data of the new registry data 23*b* relevant to generation of the new DNS data 34*b*. For example, the new registry data 23*b* could contain some data content representative of the old (e.g. current) zone data 34*a* of the TLD 14*a*.

At step 408, the DNS publication service 24 uses the new registry data 23*b*, along with DNSSEC signing key settings 27 of the DNS signing system 25*a* (for the new registry operator 20*b*), to generate new DNS data 34*b* including one or more signatures in order to provide the new DNS data 34*b* as a signed zone.

For example, the step of generating the one or more signatures can include a first signing stage of querying the operational DNS data 34*a* using public DNS queries to obtain the public key portions of the existing keys of the TLD 14*a*. Once obtained, then the existing public keys portions are combined with new private key portions (e.g. as provided by the new registrant 16/registry operator 20*b* for the transitioned TLD 14*b*—as provided for in the signing system 25*a* for the registry operator 20*b*) in order to generate new DNS data 34*b* including one or more signatures in order to provide the new DNS data 34*a* as a signed zone but as yet unsecured, such that the one or more signatures of the new DNS data 34*b* includes the one or more existing public keys of the current TLD 14*a*.

At step 410, the DNS publication service 24 uses a publication system 25*b* to publish in a first mode the new DNS data 34*b* to the nodes (e.g. servers 32) of the DNS 30 as the signed/unsecure zone for the TLD 14*b* (including the one or more signatures). Further, as part of the publication in the first mode, the publication system 25*b* disables (or otherwise restricts) write functionality of the new DNS data 34*b* while at the same time facilitating querying 9 of the new DNS data 34*b* by the registrars 16 at step 412. Disabling write functionality can also be described as "permitting read-only operations/functionality". For example, it can be implemented via registry configurations by disabling all operations that write/update the registry database 18*b* (for the registry data 23*b*) and/or generate/publish updates/changes to the DNS data 34*b* sent to the DNS 30.

In other words, The DNS publication system 24 allows access to the DNS data 34*b* by the registrars 16 and others over the network 11, via the network interface 101—see FIG. 3, while at same time blocks or otherwise inhibits changes/updates being generated and published to the new DNS data 34*b*. For example, one mode of inhibiting real-time updates (e.g. write capability) of the new DNS data 34*b* would be for the DNS publication system 24 to temporarily reject or otherwise hold in abeyance any processing of received update/change requests 9 (at step 413) for the DNS data 34*b*, for example as received from the registry operator 20*b* and/or the registrar(s) 16 via the network interface 101 In other words, the DNS publication system 24 would withhold any update/change requests 9 from the system(s) 25*a,b*. In another example, the DNS publication system 24 could inhibit updates (e.g. write capability) of the new DNS data 34*b* by allowing receipt of the update/change requests 9 (at step 413) while at the same time disabling operation of the signing system 25*a* and/or publication system 25*b*, thereby not allowing the system(s) 25*a,b* to act on any received update/change requests 9 for the DNS data 34*b*. It is recognised that while in the first mode, the TLD 14*b* would be considered as having an operational zone, yet unsecure. In other words, while the new DNS data 34*b* is published in the first mode, the new DNS data 34*b* would not yet be usable by the servers 32, 35 to navigate the DNS 30 (i.e. satisfy DNS requests).

While allowing access to the DNS data 34*b* at step 412, the registry services provider 22 could receive update/change data content at step 413 from the registrars 16, the update/change data content relevant to the new DNS data 34*b*. During step 412, the registry services provider 22 gives the registrars 16 time to check/confirm the new DNS data 34*b* content with their own records (i.e. registrar data 17*b*). As such, if the registrar(s) 16 determine that their registrar data 17*b* for the transitioned TLD 14*b* (as defined by the new DNS data 34*b* and new registry data 23*b* for that matter) does not match (e.g. does not reconcile), then the registrar 16 could send update/change request(s) 9 to the registry services provider 22 representative of the data content of the registrar data 17*b*.

At step 412, the publication system 24 also waits for hold down period to expire (e.g. the twice the length of the Name Server (NS) records apex set), thereby monitoring an expiry in the DNS 30 of Time To Live (TTL) for existing signatures in the new zone data 34*b*. It is recognised that the hold down period is useful in that during this period the publication service 24 waits for all the resolver servers 35 in the DNS 30 to stop caching the old signatures. Accordingly, at step 411, once the TTL has expired and hence the hold down period is over, in a second signing stage, the publication system 24 uses provided new public key portions (along with the new private key portions) to generate one or more signatures for new zone data 34*b* in order to provide the new zone data 34*b* as a secured/signed zone and includes the one or more signatures and keys in the new zone data 34*b* to the nodes of the DNS 30 by publishing in the second mode at step 414. It is recognised that part of publishing in the second mode is the act of securing the zone via publishing new Delegation signer (DS) records, contained in the new DNS data 34*b*, in the parent zone of the DNS 30. Further, also provided for in step 414 is replacing of any remaining DNSSEC current keys (of the current DNS data 34*a*) in the DNS 30 with the new keys (e.g. new public key portions of the DNS data 34*b*). It is recognised that the existing public keys of the TLD 14*a* are different than the new public keys of the TLD 14*b*. Further, it is recognised that the private keys of the TLD 14*a* are different than the new private keys of the TLD 14*b*.

With respect to the steps 408 and 411 for use of the signing system 25*a*, it is recognised that the publication system 24 can access one or more existing public keys of the existing zone data 34*a* by implementing corresponding one or more DNS queries 9 to the DNS 30, wherein the one or more existing public keys are utilized in the step of generating the one or more signatures for inclusion in the new DNS data 34*b*. It is recognised that the DNS data 34*a*, 34*b* can include signature records as well as corresponding key records. For example, the one or more signatures can include new delegation signer records. Further, the steps 411, 414 can include replacing existing delegation signer records of the new zone data 34*b* with new delegation signer records. Further, the steps 412, 411, 414 can include delaying publication of new delegation signer records with the new zone data 34*b* for a specified period of time (e.g. a specified hold down period). Further, the steps 408, 411 can include accessing one or more new public keys of the new zone data 34*b* by implementing corresponding one or more DNS queries 9, wherein the one or more new public keys are utilized in generating the one or more signatures contained in the new DNS data 34*b*.

Therefore, as discussed, the existing DNS data 34*a* is not available to the publication system 24 and therefore the publication system 24 must rebuild the set of existing DNS data 34*a* from available information sources other than the actual zone file of the existing DNS data 34*a*, as discussed herein. In this regard, it is recognised that that the incumbent/existing DNS 30 provider for the existing TLD 14*a* is not cooperative with the publication system 24, hence a standard DNSSEC transition process is not possible (see scenario 3 for the case of a cooperative incumbent DNS provider). Therefore, anticipated is that when the incumbent/ existing DNS 30 provider is not cooperative, then the publication system 24 could perform the DNSSEC transition by brute force by publishing in the first and second modes using DNSSEC transition techniques of removing the old DNS records of the existing DNS data 34a (e.g. existing signatures, existing DNSSEC keys and existing DS records) and thereby replace these existing DNS data 34a with corresponding replacement/new DNS data 34b (e.g. new signatures, new DNSSEC keys and new DS records) in the zone, recognizing that this replacement could cause the zone to go bogus for a period of time until all of the TTLs expire.

Further, once published in the second mode, at step 416 the service 22,24 enables write functionality of the new DNS data 34b as well as the new registry data 23b (thus allowing the receipt and processing of the update/change requests 9 from the registrars 16 and/or registrants 12 in real time (for example)—e.g. via EPP requests containing EPP commands). In other words, the service(s) 22, 24 would allow for processing of any received EPP commands 9 (e.g. via the systems 25a,b and/or the EPP server of the registry operator 20b) at step 418. For example, the service (s) 22, 24 would not hold in abeyance any received requests 9. For example, the service(s) 22, 24 would not restrict operation of the system 25a,b from acting on the commands contained in any received requests 9 at step 418.

The second mode publication of step 414 therefore facilitates the write functionality of the new DNS data 34b in real time, including operation of the systems 25a,b in response to received update/change requests 9 of the new DNS data 34b to reflect actions (see examples as provided above wrt EPP transactions) contained in the update/change requests 9, as provided for in steps 416, 418. It is recognised that in the second mode, the new DNS data 34b would be available for use by the servers 32,35 to implement operation of the TLD 14b in the DNS 30, in other words the new DNS data 34b of the second mode would be considered as an operational zone for the TLD 14b. For example, at step 418 once write functionality was enabled at step 416, the service 22,24 and/or the registry operator 20b would receive update/change requests 9 (e.g. containing EPP commands) to add/delete/change/modify any of the objects 15 associated with the data 23b,34b. In the event the received update/change requests affect the content of the DNS data 34b, the service 24 would be informed (or otherwise recognize) the required affects and thus regenerate and republish the DNS data 34b to the DNS 30 (e.g. using the systems 25a,b).

It is also recognised that the registrars 16 would have access via the network 11 to the new registry data 23b at step 412. Therefore, for the appropriate period of time during the first mode, the registrars 16 could also query 9 the new registry data 23b. Further, similar to the new DNS data 34b, any received updates/changes to the new registry data 23b would be inhibited by the registry services provider 22 (i.e. changes to the data content of the new registry database 18b could be inhibited during the first mode). During step 412, the registry services provider 22 gives the registrars 16 time to check/confirm the new registry data 23b content with their own records (i.e. registrar data 17b). As such, if the registrar(s) 16 determine that their registrar data 17b for the transitioned domain 14b (as defined by the new registry data 23b and new DNS data 34b for that matter) does not match (e.g. does not reconcile), then the registrar 16 could send update/change request(s) 9 to the registry services provider 22 representative of the data content of their registrar data 17b.

In view of the above, if it is determined by the registry services provider 22 that updates/changes to the registry data 23b is required (e.g. due to feedback/update requests 9 received from the registrars 16 received as respective Extensive Provisioning Protocol (EPP) commands by example) before publishing the new DNS data 34b in the second mode, then the registry services provider 22 could at step 416 update the content of the registry data 23b in the new registry database 18b before publishing the DNS data 34b in the second mode. Similarly, if it is determined by the registry services provider 22 that updates/changes to the DNS data 34b are required (e.g. due to feedback/update requests 9 received from the registrars 16 received as respective Extensive Provisioning Protocol (EPP) commands by example), then the registry services provider 22 could at step 418 update the content of the DNS data 34b (e.g. based on updates/changes to the registry data 23b in the new registry database 18b) after publishing the DNS data 34b in the second mode. It is recognised that the update requests 9 from the registrars 16 contain update (e.g. additional) data 23c, 34c determined as not present in the published data 23b,34b, as inspected/accessed by the registrars 16 during step 412 as well as once published in step 414. The update data 23c, 34c would be used by the registry services provider 22 to add to, delete from, or otherwise correct (e.g. change/modify) the generated data 23b,34b as published during the first mode. It is recognised that any additions/deletions/changes/modifications to the data 23b,34b as published in the first mode would be incorporated in the data 23b,34b before (or after as the case may be) publishing in the second mode.

As such, as discussed above, the new DNS data 34b and the new registry data 23b in the first mode as well as in the second mode are accessible by the plurality of registrars 16 over the communications network 11. Further, it is recognised that zone files (e.g. DNS data 34a,34b) only capture domain name and host related data, but not contact data, domain status, and any domain lifecycle data. RDDS data can contain domain status, domain lifecycle, and sometimes contact information (depending on GDPR policies). It is also recognised that the contact data, domain status, and any domain lifecycle data can come (e.g. in part, during the aggregation of the registrar data 17a) from the registrars 16 themselves, as part of step 402 for example.

Transition Scenario 3

Figure 2C:
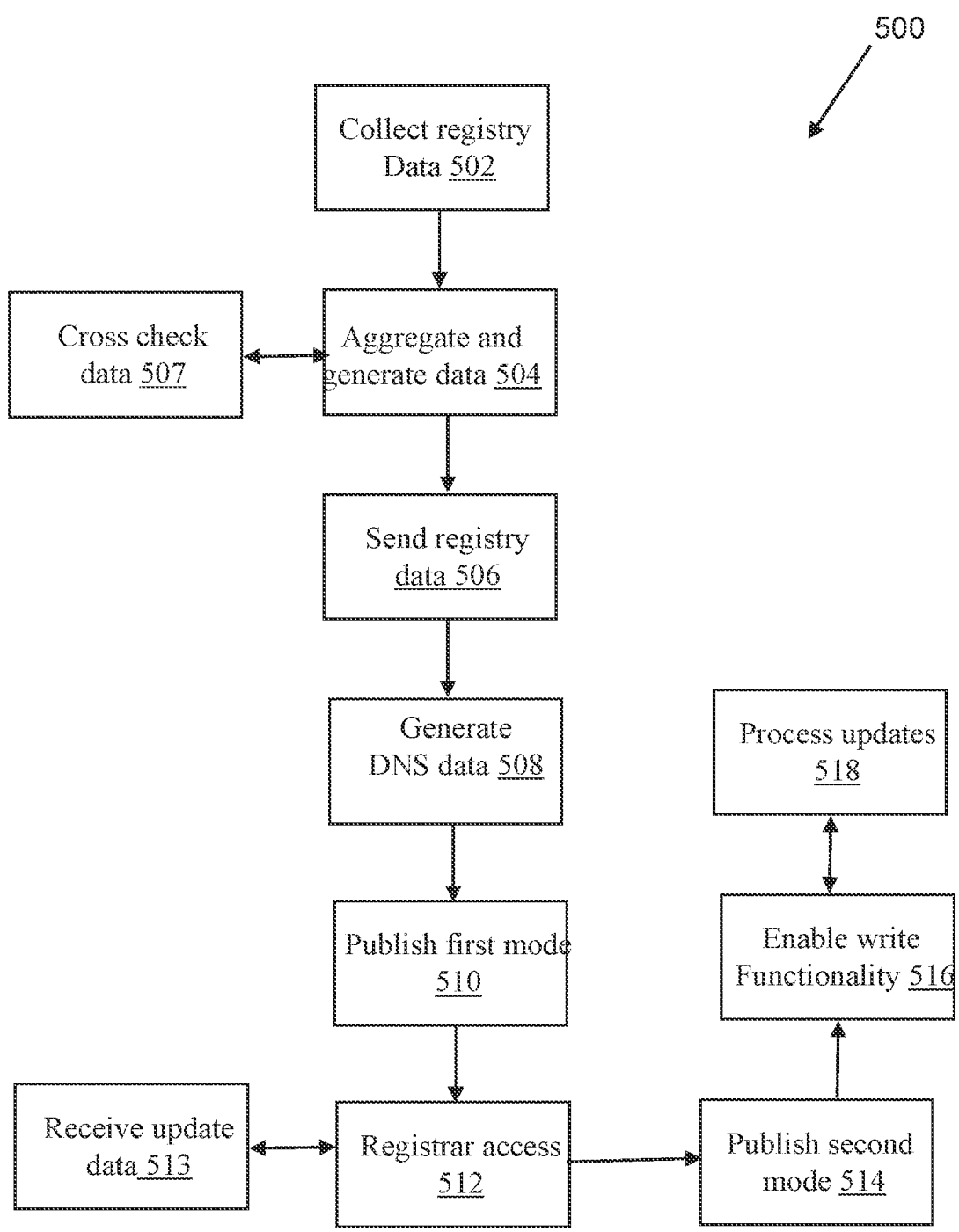
FIG. 2c is a flowchart of a still further example implementation for the system of FIG. 1.

Referring to FIGS. 1 and 2c, in example transition scenario 3 which is considered as a DNSSEC transition, the base constraints are that some or all of the content of the current registry data 23a is either missing or unavailable from the existing registry operator 20a (e.g. due to a bankruptcy event, etc.). Therefore, it is recognised that "missing" and/or "unavailable" data can mean that anywhere from 0-99% of the data is not available. In other words, at least some of (i.e. greater than 0% and less than 100%) the registry data 23a and/or the zone data 34a is missing or otherwise suspect.

Further, as part of the scenario 3 situation, the zone is actually live, i.e. the DNS data 34a is active/enabled in the DNS 30 and as such the TLD 14a associated with the registry database 18a can be considered to have an operational zone, and further (contrary to scenario 2) access to the zone data 34a is available to the registry service provider 22 for use in the transition process of TLD 14a to TLD 14b (i.e. zone data 34a transfer is enabled and hence only a DNSSEC transition is performed). Accordingly, as at least some of the data 23a is missing, transition scenario 3 will include a process of requesting/receiving data content of the registry data 23a from the registrar(s) 16 associated with the TLD(s) 14a under transition.

Referring to FIG. 2c, shown is a method 500 for transitioning current registry data 23a for establishing the transitioned TLD 14*b* as accessible over a communications network 11, the current registry data 23*a* representing a current TLD 14*a* (as assigned to the current registry operator 20*a*) initially having an operational zone which is also accessible (i.e. DNS data transfer is enabled and as such the zone file can be interrogated to obtain zone data 34*a* for use in generating DNS data 34*b*).

A first step 502 includes the registry services provider 22 collecting existing/current registry data 23*a* content from a plurality of registrars 16 (e.g. one or more registrars 16 recognizing that the registrar(s) 16 shown in FIG. 1 can represent one or more individual registrars 16) associated with one or more domain names of the TLD 14*a*, such that each of the plurality of registrars 16 provides a respective portion of the complete registry data 23*a* for the TLD 14*a*. As discussed above, the current registry data 23*a* can include any of the content associated with the registry objects 15, provided as example data 23*a* content. It is recognised that even in the case where the DNS data 34*a* of the current TLD 14*a* (associated with the registry database 18*a*) is considered operational, the registrar(s) 16 would have available registry data 23*a* (in their registrar data 17*a*) associated with the current TLD 14*a*, as they obtained when the current TLD 14*a* was first created (e.g. purchased in previous transaction(s) between the registrant 12 and the registrar(s) 16) and/or as was generated/published when the current TLD 14*a* was operational in the DNS 30—i.e. operational DNS data 34*a* utilized by users of the TLD 14*a* via interaction with the DNS 30 as discussed above. In this manner, the registry services provider 22 can request what registry data 23*a* content the registrar(s) 16 have in their data records that is associated with the current TLD 14*a*, i.e. the registrar data 17*a*, and receive same via a network interface 101 (see FIG. 3).

Further to the above, it is recognised that the current registry data 23*a* can include at least one of contact data and domain status data. Further to the above, the current registry data 23*a* can include administration data for a plurality of registrants 12 for domain names of the TLD 14*a*; and the new registry data 23*b*, once generated, is stored in the new registry database 18*b* for the TLD 14*b*. Further to the above, the collected registry data 23*a* collected from the plurality of registrars 16 can be supplemented with additional registry data 23*a* obtained from other data sources such as an existing registry database 18*a* of the registry operator 20*a*. Further to the above, the current registry data 23*a* can be obtained by the registry services provider 22 from another data source such as a backup database (not shown), stored as offline backup data. For example, the offline backup data can be escrow data (e.g. for the TLD 14*a* as a gTLD). Further to the above, the current registry data 23*a* is collected from the plurality of registrars 16 and additional registry data 23*a* can be obtained from (e.g. extracted from) another data source such as the existing/accessible zone file of the TLD 14*a*.

As part of the first step 502, the current registry data 23*a* could be collected using from another data source such as RDDS (e.g. WHOIS data as available on the network 11). RDDS stands for Registry Registration Data Directory Services, such that the current registry data 23*a* can be obtained from an RDDS database (e.g. as part of the registry database 18*a*). For example, Registration Data Directory Services can refer to a collective of WHOIS and Web based WHOIS services. Also know as a WHOIS directory. The WHOIS can be defined as a database containing contact and registration information for domain names of the TLD 14*a*. For example you can find out who registered the domain names of the TLD 14*a*, with what registrar 16 and even contact details so you can get in touch. The WHOIS database can consist of a set of text records for each resource. These text records can consist of various items of information about the resource itself, and any associated information of assignees, registrants, administrative information, such as creation and expiration dates, mailing address, phone number and e-mail address of those owning or administrating the domain name of the TLD 14, as made publicly available through the "WHOIS" directories.

At step 504, the registry services provider 22 aggregates the respective portions of the current registry data 23*a* (e.g. collected from the registrar(s) 16 and optionally any other data sources as discussed above) and generates a set of the new registry data 23*b* suitable for storage in the new registry database 18*b*. The new registry data 23*b* could be cross checked or otherwise validated as further described below, in validation step 507. For example, it is recognised that the validation step 507 could come before generation of the new DNS data 34*b*, as the new registry data 23*b* would be used as a basis for the generation of the new DNS data 34*b*.

At step 506, the registry services provider 22 communicates with the DNS publication service 24 (e.g. a module 25*a,b* that is part of the publication system 24—e.g. as operated by the registry services provider 22) and provides data of the new registry data 23*b* relevant to generation of the new DNS data 34*b*. For example, the new registry data 23*b* could contain some data content representative of the old (e.g. current) zone data 34*a* of the TLD 14*a*.

At step 508, the DNS publication service 24 uses the new registry data 23*b*, along with DNSSEC signing key settings 27 of the DNS signing system 25*a* (as obtained from the currently available DNS data 34*a*), to generate new DNS data 34*b* including one or more signatures in order to provide the new DNS data 34*b* as a signed and secured zone.

At step 510, the DNS publication service 24 uses a publication system 25*b* to publish in a first mode the new DNS data 34*b* to the nodes (e.g. servers 32) of the DNS 30 as the signed/secure zone for the TLD 14*b* (including the one or more signatures). Further, as part of the publication in the first mode, the publication system 25*b* disables (or otherwise restricts) write functionality of the new DNS data 34*b* while at the same time facilitating querying 9 of the new DNS data 34*b* by the registrars 16 at step 512. Disabling write functionality can also be described as "permitting read-only operations/functionality". For example, it can be implemented via registry configurations by disabling all operations that write/update the registry database 18*b* (for the registry data 23*b*) and/or generate/publish updates/changes to the DNS data 34*b* sent to the DNS 30.

In other words, The DNS publication system 24 allows access to the DNS data 34*b* by the registrars 16 and others over the network 11, via the network interface 101—see FIG. 3, while at same time blocks or otherwise inhibits changes/updates being generated and published to the new DNS data 34*b*. For example, one mode of inhibiting real-time updates (e.g. write capability) of the new DNS data 34*b* would be for the DNS publication system 24 to temporarily reject or otherwise hold in abeyance any processing of received update/change requests 9 (at step 513) for the DNS data 34*b*, for example as received from the registry operator 20*b* and/or the registrar(s) 16 via the network interface 101 In other words, the DNS publication system 24 would withhold any update/change requests 9 from the system(s) 25*a,b*. In another example, the DNS publication system 24 could inhibit updates (e.g. write capability) of the new DNS data 34*b* by allowing receipt of the update/change requests 9 (at step 513) while at the same time disabling operation of the signing system 25a and/or publication system 25b, thereby not allowing the system(s) 25a,b to act on any received update/change requests 9 for the DNS data 34b. It is recognised that while in the first mode, the TLD 14b would be considered as having an operational zone. In other words, while the new DNS data 34b is published in the first mode, the new DNS data 34b could be usable by the servers 32, 35 to navigate the DNS 30 (i.e. satisfy DNS requests).

While allowing access to the DNS data 34b at step 512, the registry services provider 22 could receive update/change data content at step 513 from the registrars 16, the update/change data content relevant to the new DNS data 34b. During step 512, the registry services provider 22 gives the registrars 16 time to check/confirm the new DNS data 34b content with their own records (i.e. registrar data 17b). As such, if the registrar(s) 16 determine that their registrar data 17b for the transitioned TLD 14b (as defined by the new DNS data 34b and new registry data 23b for that matter) does not match (e.g. does not reconcile), then the registrar 16 could send update/change request(s) 9 to the registry services provider 22 representative of the data content of the registrar data 17b.

It is recognised that at least initially, the public keys of the TLD 14a can be the same as the public keys of the TLD 14b. Further, it is recognised that the private keys of the TLD 14a, at least initially, can be the same as the private keys of the TLD 14b.

Further, once published in the second mode, at step 516 the service 22,24 enables write functionality of the new DNS data 34b as well as the new registry data 23b (thus allowing the receipt and processing of the update/change requests 9 from the registrars 16 and/or registrants 12 in real time (for example)—e.g. via EPP requests containing EPP commands). In other words, the service(s) 22, 24 would allow for processing of any received EPP commands 9 (e.g. via the systems 25a,b and/or the EPP server of the registry operator 20b) at step 518. For example, the service (s) 22, 24 would not hold in abeyance any received requests 9. For example, the service(s) 22, 24 would not restrict operation of the system 25a,b from acting on the commands contained in any received requests 9 at step 518.

The second mode publication of step 514 therefore facilitates the write functionality of the new DNS data 34b in real time, including operation of the systems 25a,b in response to received update/change requests 9 of the new DNS data 34b to reflect actions (see examples as provided above with respect to EPP transactions) contained in the update/change requests 9, as provided for in steps 516, 518. It is recognised that in the second mode, the new DNS data 34b would be available for use by the servers 32,35 to implement operation of the TLD 14b in the DNS 30, in other words the new DNS data 34b of the second mode would be considered as an operational zone for the TLD 14b. For example, at step 518 once write functionality was enabled at step 516, the service 22,24 and/or the registry operator 20b would receive update/change requests 9 (e.g. containing EPP commands) to add/delete/change/modify any of the objects 15 associated with the data 23b,34b. In the event the received update/change requests affect the content of the DNS data 34b, the service 24 would be informed (or otherwise recognize) the required affects and thus regenerate and republish the DNS data 34b to the DNS 30 (e.g. using the systems 25a,b).

It is also recognised that the registrars 16 would have access via the network 11 to the new registry data 23b at step 512. Therefore, for the appropriate period of time during the first mode, the registrars 16 could also query 9 the new registry data 23b. Further, similar to the new DNS data 34b, any received updates/changes to the new registry data 23b would be inhibited by the registry services provider 22 (i.e. changes to the data content of the new registry database 18b could be inhibited during the first mode). During step 512, the registry services provider 22 gives the registrars 16 time to check/confirm the new registry data 23b content with their own records (i.e. registrar data 17b). As such, if the registrar(s) 16 determine that their registrar data 17b for the transitioned domain 14b (as defined by the new registry data 23b and new DNS data 34b for that matter) does not match (e.g. does not reconcile), then the registrar 16 could send update/change request(s) 9 to the registry services provider 22 representative of the data content of their registrar data 17b.

In view of the above, if it is determined by the registry services provider 22 that updates/changes to the registry data 23b is required (e.g. due to feedback/update requests 9 received from the registrars 16 received as respective Extensive Provisioning Protocol (EPP) commands by example) before publishing the new DNS data 34b in the second mode, then the registry services provider 22 could at step 416 update the content of the registry data 23b in the new registry database 18b before publishing the DNS data 34b in the second mode. Similarly, if it is determined by the registry services provider 22 that updates/changes to the DNS data 34b are required (e.g. due to feedback/update requests 9 received from the registrars 16 received as respective Extensive Provisioning Protocol (EPP) commands by example), then the registry services provider 22 could at step 518 update the content of the DNS data 34b (e.g. based on updates/changes to the registry data 23b in the new registry database 18b) after publishing the DNS data 34b in the second mode. It is recognised that the update requests 9 from the registrars 16 contain update (e.g. additional) data 23c, 34c determined as not present in the published data 23b,34b, as inspected/accessed by the registrars 16 during step 412 as well as once published in step 514. The update data 23c, 34c would be used by the registry services provider 22 to add to, delete from, or otherwise correct (e.g. change/modify) the generated data 23b,34b as published during the first mode. It is recognised that any additions/deletions/changes/modifications to the data 23b,34b as published in the first mode would be incorporated in the data 23b,34b before (or after as the case may be) publishing in the second mode.

As such, as discussed above, the new DNS data 34b and the new registry data 23b in the first mode as well as in the second mode are accessible by the plurality of registrars 16 over the communications network 11. Further, it is recognised that zone files (e.g. DNS data 34a,34b) only capture domain name and host related data, but not contact data, domain status, and any domain lifecycle data. RDDS data can contain domain status, domain lifecycle, and sometimes contact information (depending on GDPR policies). It is also recognised that the contact data, domain status, and any domain lifecycle data can come (e.g. in part, during the aggregation of the registrar data 17a) from the registrars 16 themselves, as part of step 502 for example.

Further, in view of scenarios 2,3, in terms of the validation steps 407, 507, the methods 400,500 can include cross-checking, e.g. reconciliation, of the registry data 23b with the RDDS data (e.g. provided by third party RDDS data providers 36) and/or any existing zone data 34a. The step 407,507 for cross checking is to identify whether there are one or more conflicts between the new registry data 23b with the new zone data 34b. Further, the compatibility of the existing zone data 34a with the existing registry data 23a can be performed, in order to determine if there are any conflicts present between the registry data 23a and the existing zone data 34*a*. The crosschecking between the registry data 23*a* and the existing zone data 34*a* can be performed prior to using the registry data 23*a* and the existing zone data 34*a* in generation of the new registry data 23*b* and the new zone data 34*b*.

As an example of the cross checking, a verification process A can be used if RDDS data is available (e.g. verify collected data with RDDS data). In terms of Verification A, the registry services provider 22 performs registry data 23*a*,*b* reconciliation with publicly available services 36 offering the RDDS data. Examples of verification A include: 1) domain name of the TLD 14 exists in the registry data 23*a* but does not exist in the RDDS data, 2) domain name of the TLD 14 exists in the registry data 23*b* but does not exist in the RDDS data, 3) domain name of the TLD 14 exists in both data (data 23*a* and RDDS data), however there is a mismatch in information (e.g. the names and/or other object 15 information are not completely matching), and 4) domain name of the TLD 14 exists in both data (data 23*b* and RDDS data), however there is a mismatch in information (e.g. the names and/or other object 15 information are not completely matching). The information checked can include object information 15 such as but not limited to; contact information, registrar sponsorship, domain attributes such as registration/expiry date, domain status, and/or name server.

As an example of the cross checking, a verification process B can be used if existing zone data 34*a* is available (e.g. verify collected data with DNS data 34*a*). In terms of Verification B, the registry services provider 22 performs registry data 23*a*,*b* reconciliation with any available DNS data 34*b*. Examples of verification B include: 1) Domain name of the TLD 14 exists in the registry data 23*a* but does not exist in the zone data 34*a*, 2) Domain name of the TLD 14 exists in the registry data 23*b* but does not exist in the zone data 34*a*, 3) Domain name of the TLD 14 exists in the zone data 34*a* but does not exist in the registry data 23*a*, 4) Domain name of the TLD 14 exists in the zone data 34*a* but does not exist in the registry data 23*b*, 5) Domain name 14 exists in both data 23*a*,34*a*, however a mismatch in information is identified, such as nameservers/IP, 6) Domain name of the TLD 14 exists in both data 23*b*,34*a*, however a mismatch in information is identified, such as nameservers/IP, 7) Domain name of the TLD 14 status in registry data 23*a* reflects certain functionality expected in zone data 34*a*, however zone data 34*a* does not reflect the appropriate function, and 8) Domain name of the TLD 14 status in registry data 23*b* reflects certain functionality expected in zone data 34*a*, however zone data 34*a* does not reflect the appropriate function. The information checked can include object information 15 such as but not limited to; contact information, registrar sponsorship, domain attributes such as registration/expiry date, domain status, and/or name server name.

In view of the above, the implementation of verification A and/or verification B can also be performed on any of the update data 23*c*, 34*c* received from the registrars 16.

In view of the above transition scenarios 1,2,3, it is recognised that zone files can only provide domain name and host related data, but not contact data, domain status, and any domain lifecycle data. RDDS can therefore be used to provide domain status, domain lifecycle, and sometimes contact information (depending on GDPR policies). As discussed above, transition scenario 2 is for a live zone however the publication system 24 cannot transfer zone (i.e. can't query transfer zone data, i.e. zone file from the DNS 30, and as such the third party DNS provider is uncooperative), while transition scenario 3 is for a live zone with transfers enabled so the publication system 24 can recreate the zone file for the DNS data 34*a* by utilizing the current (and accessible) zone file for the new/transition DNS data 34*b*, as the third party DNS provider is cooperative. Further, it is recognised that for scenario 2,3, the verification process A can be used if RDDS is available (e.g. in order to verify collected data 23*a* with RDDS data). However, in terms of scenario 3, verification process B can be used as the zone file for the DNS data 34*a* is available and live.

In general, it is recognised that the entities 16, 18, 20*a*,*b*, 22, 24 can interact on the network 11 with one another in client server pairs. For example, the registrar 16 can be the EPP client and the registry database 18*a*,*b* (with associated registry operator 20*a*,*b*) can be the paired EPP server. In general, an EPP server responds to a successful connection by returning a greeting to the client. The client waits for the greeting before sending an EPP command (i.e. action) to the server. EPP commands 9 and responses 9 are exchanged serially between the client and the server over the network 11, in order to affect the data contents of the corresponding objects 15 (of the registry data 23*a*,*b*) that are acted upon by the action implemented by the server (i.e. as requested by the client). The server responds to each EPP command with a coordinated response that describes the results of processing the command.

EPP commands fall into three categories: session management commands, query commands, and data transform commands. Session management commands are used to establish and end sessions with an EPP server. Query commands are used to perform read-only, object-based information retrieval operations with respect to data contents of the objects 15. Transform commands are used to perform read-write object management operations with respect to the data contents of the objects 15.

EPP provides commands to manage sessions, retrieve object information, and perform transformation operations on objects. All EPP commands are atomic and idempotent, either succeeding completely or failing completely and producing predictable results in case of repeated execution. EPP provides three commands/actions to retrieve object information: action <info> to retrieve detailed information associated with a known object, action <ping> to determine if an object is known to the server, and action <transfer> to retrieve known object transfer status information. EPP provides five commands/actions to transform (i.e. modify the data contents of the object 15) objects 15: action <create> to create an instance of an object 15 with a server, action <delete> to remove an instance of an object 15 from a server, action <renew> to extend the validity period of an object 15, action <update> to change information associated with an object 15, and action <transfer> to manage changes in client sponsorship (e.g. change in registrant 12) of a known object 15. As such, instance of an object 15 refers to the specific data contents of an object 15. EPP uses four decimal digits to describe the success or failure of each EPP command. The four digits of the reply each have special significance. The first digit denotes whether the response submitted by the server back to the client marks command success or failure. A client that wants to know approximately what kind of error occurred (command syntax error, security error, system error, etc.) can examine the second digit. The third and fourth digits are used to provide explicit information detail by the server to the client with respect to the results of command execution and object 15 data contents change thereby.

Referring to FIG. 1, shown are the registry services provider 22,24 and registry operator 20*a*,*b* responsible for the transition of the plurality of domain names of the TLD 14. The domain names of the TLD 14 represent Internet 11 resources (e.g. web pages, databases, etc.) accessible via a specified URI (over the network 11) incorporating the domain name associated with the specified TLD 14 maintained in domain name registry database 18*a,b* using an appropriate network communications protocol (e.g. TCP/IP, HTTP, HTTPS, etc.). For example, the network 11 communications protocol includes rules for data formats for data exchange and rules for network address formats for data exchange that identify both the sender network 11 address and the intended receiver(s) network 11 address. In computing, the URI is a string of characters used to identify a name or a resource. Such identification enables interaction with representations of the resource over a network (typically the World Wide Web) using the specific protocols. Schemes specifying a concrete syntax and associated protocols define each URI, such that URIs can be classified as locators (URLs), as names (URNs), or as both. A uniform resource name (URN) functions like a person's name, while a uniform resource locator (URL) resembles that person's street address. In other words: the URN defines an item's identity, while the URL provides a method for finding the item over the network 11.

In view of the above descriptions of storage 18*a,b* for the computer devices 100 (see FIG. 3) of registry operator 20*a,b* and service 22, 24 storage 18*a,b* can be configured as keeping the stored data (e.g. objects 15) in order and the principal (or only) operations on the stored data are the addition/amendment of or removal of the stored data from storage 18*a,b* (e.g. FIFO, FIAO, etc.). For example, storage 18*a,b* can be a linear data structure for containing and subsequent accessing of the stored data and/or can be a non-linear data structure for containing and subsequent accessing of the stored data.

Further, storage 18*a,b* receives various entities such as data that are stored and held to be processed later. In these contexts, storage 18*a,b* can perform the function of a buffer, which is a region of memory used to temporarily hold data while it is being moved from one place to another (i.e. between the between computer devices 100). Typically, the data is stored in the memory when moving the data between processes within/between one or more computers. It is recognised that storage 18*a,b* can be implemented in hardware, software, or a combination thereof. The storage 18*a,b* is used in the network system 10 when there is a difference between the rate/time at which data is received and the rate/time at which the data can be processed (e.g. ultimately by the devices 100).

Further, it will be understood by a person skilled in the art that memory/storage 18*a,b* described herein is the physical place where data can be held in an electromagnetic or optical form for access by the computer processors/modules. There can be two general usages: first, memory is frequently used to mean the devices and data connected to the computer through input/output operations such as hard disk and tape systems and other forms of storage not including computer memory and other in-computer storage. Second, in a more formal usage, memory/storage 18*a,b* has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of memory 18*a,b* as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage 18*a,b* can also be defined as a physical electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

In terms of a server (acting as a client or as a server of a classic client-server relationship), it is recognised that the computer devices 100 can be configured as hardware, software, or typically a combination of both hardware and software to provide a network entity that operates as a socket listener. It is recognised that any computerised process that shares a resource (e.g. data) to one or more client processes can be classified as a server in the network system 10. The term server can also be generalized to describe a host that is deployed to execute one or more such programs, such that the host can be one or more configured computers that link other computers or electronic devices together via the network 11. The computer devices 100 implementing functionality of registry operator 20*a,b*, registrars 16, and service 22,24 can provide specialized services across the network 11, for example to private users inside a large organization or to public users via the Internet 11. In the network system 10, the servers can have dedicated functionality and/or can share functionality as described. Enterprise servers are servers that are used in a business context and can be run on/by any capable computer hardware. In the hardware sense, the word server typically designates computer models intended for running software applications under the heavy demand of a network 11 environment. In this client-server configuration one or more machines, either a computer or a computer appliance, share information with each other with one acting as a host for the other. While nearly any personal computer is capable of acting as a network server, a dedicated server will contain features making it more suitable for production environments. These features may include a faster CPU, increased high-performance RAM, and typically more than one large hard drive. More obvious distinctions include marked redundancy in power supplies, network connections, and even the servers themselves.

Referring to FIG. 3, a computing device 100 implementing functionality of registry operator 20*a,b*, registrars 16 and service 22,24 can include a network connection interface 101, such as a network interface card or a modem, coupled via connection 118 to a device infrastructure 104. The connection interface 101 is connectable during operation of the devices to the network 11 (e.g. an intranet and/or an extranet such as the Internet), which enables the devices to communicate with each other as appropriate. The network 11 can support the communication of the communications 9, 23*a,b,c*, 34*a,b*, as well as between the servers 32, 33, 35, 36 and the related content.

Referring again to FIG. 3, the device 100 can also have a user interface 102, coupled to the device infrastructure 104, to interact with a user (e.g. server administrator—not shown). The user interface 102 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 104.

Referring again to FIG. 3, operation of the device 100 is facilitated by the device infrastructure 104. The device infrastructure 104 includes one or more computer processors 108 and can include an associated memory 122 (e.g. memory 18*a,b*). The computer processor 108 facilitates performance of the device 100 configured for the intended task (e.g. of the respective module(s) 25*a,b* of service 24, operator 20*a,b*, and/or registrars 16) through operation of the network interface 101, the user interface 102 and other application programs/hardware of the device 100 by executing task related instructions (e.g. 105). These task related instructions 105 can be provided by an operating system, and/or software applications located in the memory 122, and/or by operability that is configured into the electronic/digital circuitry of the processor(s) 108 designed to perform the specific task(s). Further, it is recognized that the device infrastructure 104 can include a computer readable storage medium 109 coupled to the processor 108 for providing instructions to the processor 108 and/or to load/update the instructions 107 (e.g. modules 25*a,b*). The computer readable medium can include hardware and/or software such as, by way of example only, magnetic disks, magnetic tape, optically readable medium such as CD/DVD ROMS, and memory cards. In each case, the computer readable medium may take the form of a small disk, floppy diskette, cassette, hard disk drive, solid-state memory card, or RAM provided in the memory module. It should be noted that the above listed example computer readable mediums can be used either alone or in combination.

Further, it is recognized that the computing device 100 can include the executable applications comprising code or machine readable instructions for implementing predetermined functions/operations including those of an operating system and the modules, for example. The processor 108 as used herein is a configured device and/or set of machine-readable instructions for performing operations as described by example above, including those operations as performed by any or all of the modules 25*a,b*. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the modules may be implemented in hardware, software or a combination of both. Accordingly, the use of a processor 108 as a device and/or as a set of machine-readable instructions is hereafter referred to generically as a processor/module for sake of simplicity. Further, it is recognised that the service 22,24, registrar 16 and/or operator 20*a,b* can include one or more of the computing devices 100 (comprising hardware and/or software) for implementing the modules, as desired.

It will be understood in view of the above that the computing devices 100 may be, although depicted as a single computer system, may be implemented as a network of computer processors, as desired.

What is claimed is:

1. A method for transitioning an existing TLD (Top Level Domain) from an existing registry operator to a new TLD of a new registry operator, the new TLD subsequently accessible over a communications network, the existing TLD having a non-operational zone, which method comprises:
    collecting existing registry data for the existing TLD from a plurality of registrars associated with one or more domain names of the existing TLD, such that each of the plurality of registrars provides a respective portion of the existing registry data;
    aggregating the respective portions of the existing registry data to generate new registry data for the new TLD;
    using the new registry data to generate new zone data for the new TLD, the new registry data containing at least some data representative of existing zone data for the existing TLD;
    publishing in a first mode the new zone data to nodes of a DNS (Domain Name system), the first mode disabling write functionality of the new zone data while facilitating querying of the new zone data; and
    publishing in a second mode the new zone data to the nodes of the DNS, the second mode facilitating the write functionality of the new zone data, including said querying and updating of the new zone data, the new zone data of the second mode considered as an operational zone;
    wherein the new zone data and the new registry data in the first mode as well as in the second mode are accessible by the plurality of registrars over the communications network.

2. The method of claim 1, wherein while in the first mode a status of the new TLD is non operational by inhibiting updates to the new zone data.

3. The method of claim 1, further comprising the step of receiving updates to the new zone data from one or more of the plurality of registrars and republishing the new zone data including said updates.

4. The method of claim 1 further comprising the step of receiving updates to the new registry data from one or more of the plurality of registrars and storing the new registry data including said updates.

5. The method of claim 1, wherein said querying and said updating utilizes respective Extensive Provisioning Protocol (EPP) commands.

6. The method of claim 1, wherein said generating the new zone data includes provisioning DNSSEC (Domain Name System Security Extensions) signing key settings on a DNSSEC signing system and generating one or more signatures for the new zone data in order to provide the new zone data as a signed zone.

7. The method of claim 1, wherein the existing registry data includes at least one of contact data and domain status data.

8. The method of claim 1, wherein the existing zone data is collected from another data source other than the plurality of registrars.

9. The method of claim 1, wherein the step of generating one or more signatures includes generating one or more new public keys, such that the existing zone data contains one or more existing public keys, such that the one or more signatures includes the one or more new public keys.

10. The method of claim 8, wherein the new zone data includes new root zone data.

11. The method of claim 1, wherein the existing registry data includes administration data for a plurality of registrants for domain names of the existing TLD; and the new registry data is stored in a new registry database for the new TLD.

12. The method of claim 1, further comprising the step of: cross checking the existing registry data with the existing zone data in order to identify one or more conflicts.

13. The method of claim 1, further comprising the step of: supplementing the existing registry data collected from the plurality of registrars with additional registry data obtained from at least one of an existing registry database of the TLD and a current operator of the TLD.

14. The method of claim 13, further comprising the step of reconciling the additional registry data with the existing registry data.

15. The method of claim 13, wherein the existing registry data is stored as offline backup data.

16. The method of claim 15, wherein the offline backup data is escrow data and the existing TLD is a gTLD (generic Top Level Domain).

17. The method of claim 1, further comprising the step of: supplementing the existing zone data with additional zone data obtained from at least one of an existing registry database of the TLD and a current operator of the TLD.

18. The method of claim 17, further comprising the step of reconciling the additional zone data with the existing zone data.

19. The method of claim 17, wherein the existing zone data is stored as offline backup data.

20. The method of claim 19, wherein the offline backup data is escrow data and the existing TLD is a gTLD.

21. A method for transitioning an existing TLD from an existing registry operator to a new TLD of a new registry operator, the new TLD subsequently accessible over a communications network, the existing TLD having an operational zone, which method comprises:
collecting existing registry data for the existing TLD from a plurality of registrars associated with one or more domain names of the existing TLD, such that each of the plurality of registrars provides a respective portion of the existing registry data;
aggregating the respective portions of the existing registry data to generate new registry data for the new TLD;
using the new registry data to generate new zone data for the new TLD, the new registry data containing at least some data representative of existing zone data of the operational zone for the existing TLD;
publishing in a first mode the new zone data to nodes of a DNS (Domain Name System) as an unsecured zone, the first mode disabling write functionality of the new zone data while facilitating querying of the new zone data;
waiting for a hold down period to expire;
generating one or more signatures for the new zone data in order to provide the new zone data as a secured zone; and
publishing in a second mode the new zone data to the nodes of the DNS, the second mode facilitating the write functionality of the new zone data, including said querying and updating of the new zone data, the new zone data of the second mode considered as a new operational zone for the new TLD and including the one or more signatures;
wherein the new zone data and the new registry data in the first mode as well as in the second mode are accessible by the plurality of registrars over the communications network.

22. The method of claim 21, wherein while in the first mode a status of the TLD is non operational by inhibiting updates to the new zone data.

23. The method of claim 21, further comprising the step of receiving updates to the new zone data from one or more of the plurality of registrars and republishing the new zone data including said updates.

24. The method of claim 21, further comprising the step of receiving updates to the new registry data from one or more of the plurality of registrars and storing the new registry data including said updates.

25. The method of claim 21, wherein said querying and said updating utilizes respective Extensive Provisioning Protocol (EPP) commands.

26. The method of claim 21, wherein said generating the new zone data includes provisioning DNSSEC signing key settings on a DNSSEC signing system and generating the one or more signatures for the new zone data in order to provide the new zone data as a signed zone.

27. The method of claim 21, wherein the existing registry data includes at least one of contact data and domain status data.

28. The method of claim 1, wherein the existing zone data is collected from another data source other than the plurality of registrars.

29. The method of claim 1, wherein the step of generating one or more signatures includes generating one or more new public keys, such that the existing zone data contains one or more existing public keys, such that the one or more signatures includes the one or more new public keys.

30. The method of claim 28, wherein the new zone data includes new root zone data.

31. The method of claim 21, further comprising the step of: accessing one or more existing public keys of the existing zone data by implementing corresponding one or more DNS queries; wherein the one or more existing public keys are utilized in said step of generating the one or more signatures, the one or more signatures including new delegation signer records.

32. The method of claim 31, further comprising the step of replacing existing delegation signer records of the new zone data with new delegation signer records.

33. The method of claim 32, further comprising the step of delaying publication of new delegation signer records with the new zone data for a specified period of time.

34. The method of claim 21, further comprising the step of: accessing one or more new public keys of the new zone data by implementing corresponding one or more DNS queries; wherein the one or more new public keys are utilized in said step of generating the one or more signatures, the one or more signatures including new delegation signer records.

35. The method of claim 34, further comprising the step of replacing existing delegation signer records of the new zone data with new delegation signer records.

36. The method of claim 35, further comprising the step of delaying publication of new delegation signer records with the new zone data for a specified period of time.

37. A method for transitioning an existing TLD from an existing registry operator to a new TLD of a new registry operator, the new TLD subsequently accessible over a communications network, the existing TLD having an operational zone, which method comprises:

collecting existing registry data for the existing TLD from a plurality of registrars associated with one or more domain names of the existing TLD, such that each of the plurality of registrars provides a respective portion of the existing registry data;

aggregating the respective portions of the existing registry data to generate new registry data for the new TLD;

accessing the existing zone data in order to generate new zone data for the new TLD, the existing zone data containing at least some data facilitating the operational zone for the existing TLD;

publishing in a first mode the new zone data to nodes of a DNS (Domain Name System), the first mode disabling write functionality of the new zone data while facilitating querying of the new zone data; and publishing in a second mode the new zone data to the nodes of the DNS, the second mode facilitating the write functionality of the new zone data, including said querying and updating of the new zone data, the new zone data of the second mode considered as a new operational zone for the new TLD;

wherein the new zone data and the new registry data in the first mode as well as in the second mode are accessible by the plurality of registrars over the communications network.

38. The method of claim 37, wherein said publishing in the first mode is as a secured zone, the first mode disabling write functionality of the new zone data while facilitating querying of the new zone data, the new zone data containing one or more signatures.

39. The method of claim 37, wherein said publishing in the first mode is as an unsecured zone, the first mode disabling write functionality of the new zone data while facilitating querying of the new zone data.

40. The method of claim 39, wherein the new zone data contains one or more signatures in order to provide the new zone data as a secured zone.

* * * * *